(12) United States Patent
Toriumi et al.

(10) Patent No.: US 9,292,232 B2
(45) Date of Patent: Mar. 22, 2016

(54) PRINTING MANAGEMENT DEVICE HAVING A CAPABILITY CHANGE JOB GENERATOR, PRINTING MANAGEMENT METHOD, PRINTING SYSTEM AND RECORDING MEDIUM

(75) Inventors: Takashi Toriumi, Kanagawa (JP); Takahiro Hashimoto, Tokyo (JP)

(73) Assignee: RICOH COMPANY, LTD., Tokyo (JP)

(*) Notice: Subject to any disclaimer, the term of this patent is extended or adjusted under 35 U.S.C. 154(b) by 12 days.

(21) Appl. No.: 13/406,608

(22) Filed: Feb. 28, 2012

(65) Prior Publication Data
US 2012/0224220 A1    Sep. 6, 2012

(30) Foreign Application Priority Data

Mar. 2, 2011    (JP) ................. 2011-045638

(51) Int. Cl.
*G06K 15/12* (2006.01)
*G06F 3/12* (2006.01)

(52) U.S. Cl.
CPC ............ *G06F 3/1204* (2013.01); *G06F 3/1211* (2013.01); *G06F 3/1262* (2013.01); *G06F 3/1263* (2013.01); *G06F 3/1288* (2013.01); *G06F 3/1229* (2013.01)

(58) Field of Classification Search
USPC ............................................. 358/1.15, 1.14
See application file for complete search history.

(56) References Cited

U.S. PATENT DOCUMENTS

2001/0007619 A1    7/2001  Kakutani
2003/0076525 A1*   4/2003  Hikawa .................. G06K 15/00
                                                           385/1.14
2004/0246504 A1   12/2004  Mitsubori
2005/0068560 A1    3/2005  Ferlitsch
2005/0243365 A1   11/2005  Noda
2006/0012825 A1    1/2006  Kadowaki (Continued)

FOREIGN PATENT DOCUMENTS

JP         3178323 A      7/1997
JP       H10-11234 A      1/1998

(Continued)

OTHER PUBLICATIONS

Extended European Search Report for corresponding European patent application No. 12155759.9 dated Jan. 27, 2014.

(Continued)

*Primary Examiner* — King Poon
*Assistant Examiner* — Andrew H Lam
(74) *Attorney, Agent, or Firm* — Harness, Dickey & Pierce, P.L.C.

(57) ABSTRACT

A non-transitory computer-readable recording medium includes a printing management program, which, when processed by a computer, causes the computer to function as a scheduling unit configured to schedule a print job in an image forming apparatus, the print job having a printing capability that matches a printing capability set in the image forming apparatus; and a capability change job generator configured to generate a capability change job having an instruction to change the printing capability set in the image forming apparatus. When the capability change job generated by the capability change job generator is scheduled in the image forming apparatus, the scheduling unit schedules the print job having the printing capability that matches the printing capability changed by the capability change job after the capability change job.

16 Claims, 19 Drawing Sheets

(56) References Cited

U.S. PATENT DOCUMENTS

| | | | |
|---|---|---|---|
| 2007/0229901 A1 | 10/2007 | Kusakabe | |
| 2007/0236725 A1* | 10/2007 | Harmon et al. | 358/1.15 |
| 2007/0253029 A1 | 11/2007 | Yamaguchi | |
| 2008/0244708 A1 | 10/2008 | Wilkie et al. | |
| 2009/0245818 A1 | 10/2009 | Miyazaki | |
| 2009/0323109 A1 | 12/2009 | Mori | |
| 2010/0214601 A1* | 8/2010 | Narita | G06F 3/121 358/1.15 |
| 2013/0070287 A1* | 3/2013 | Atawneh | G06K 15/1823 358/1.15 |

FOREIGN PATENT DOCUMENTS

| | | |
|---|---|---|
| JP | H10269047 A | 10/1998 |
| JP | 2002-108596 A | 4/2002 |
| JP | 2002-200821 A | 7/2002 |
| JP | 2003-226061 A | 8/2003 |
| JP | 200653891 | 5/2005 |
| JP | 3697067 B2 | 9/2005 |
| JP | 2005339515 A | 12/2005 |
| JP | 2007-279832 A | 10/2007 |
| JP | 2007272899 A | 10/2007 |
| JP | 2007-299286 A | 11/2007 |
| JP | 2008-168440 A | 7/2008 |
| JP | 2008-269397 A | 11/2008 |
| JP | 2009-134440 A | 6/2009 |
| JP | 2010-009219 A | 1/2010 |
| JP | 2010-128848 A | 6/2010 |

OTHER PUBLICATIONS

Japanese Office Action dated Nov. 25, 2014.
European Patent Office Action dated Nov. 26, 2014.
Office Action for Japanese Patent Application No. 2011-045638 dated May 26, 2015.
Office Action for Japanese Patent Application No. 2011-045638 dated Nov. 24, 2015.
Office Action for European Patent Application No. 12155759.9 dated Nov. 18, 2015.

* cited by examiner

FIG.8

| ITEM | CONTENT |
| --- | --- |
| ID | JOB ID |
| Name | JOB NAME |
| Copies | NUMBER OF COPIES |
| Duplex | APPLICATION OF DUPLEX PRINTING |
| Media | JOB SHEET |
| OutputBin | JOB OUTPUT LOCATION |
| Punch | LOCATIONS AND NUMBER OF PUNCH HOLES |
| RequestedPrinter | PRINTING-REQUESTED PRINTER |
| Staple | LOCATIONS AND NUMBER OF STAPLES |
| RetainDuration | JOB RETAINING DURATION |
| Customer | CLIENT NAME OF JOB |
| Description | JOB RELATED DESCRIPTION |
| InputDataStream | DATA FORMAT OF INPUT FILE |
| InputFileSize | SIZE OF INPUT FILE |
| TotalPages | NUMBER OF JOB PAGES |
| TotalSheets | NUMBER OF JOB SHEETS |
| Pages stacked | NUMBER OF PAGES OUTPUT ON STACKER |
| Sheets stacked | NUMBER OF SHEETS OUTPUT ON STACKER |
| Copies stacked | NUMBER OF COPIES OUTPUT ON STACKER |
| Cumulative pages stacked | NUMBER OF PAGES INCLUDING REPRINTED PAGES OUTPUT ON STACKER |
| Cumulative sheets stacked | NUMBER OF SHEETS INCLUDING REPRINTED SHEETS OUTPUT ON STACKER |
| Assigned to printer | DATE AND TIME AT WHICH PRINTER RECEIVED JOB |
| Size | SIZE OF JOB |
| Number of reprints | NUMBER OF TIMES OF JOB REPRINTING |
| Submitted | JOB GENERATED DATE AND TIME |
| Page range | RANGE OF PAGES TO BE PRINTED |
| Folding | FOLDING INFORMATION OF JOB |
| Binding | BINDING INFORMATION OF JOB |

FIG.9

| ITEM | CONTENT |
|---|---|
| Job ID | JOB ID |
| Job Status | JOB STATUS |
| Progress | JOB PROGRESS |
| Reason for wait | REASON FOR WAITING |
| Current Printer | ACTUALLY ASSIGNED PRINTER |
| Predicted printer | EXPECTED PRINTER |
| Printing order | PRINTING ORDER |

| ITEM | CONTENT |
|---|---|
| ID | JOB ID |
| Name | JOB NAME |
| Copies | NUMBER OF COPIES |
| Duplex | APPLICATION OF DUPLEX PRINTING |
| Media | JOB SHEET |
| OutputBin | JOB OUTPUT LOCATION |
| Punch | LOCATIONS AND NUMBER OF PUNCH HOLES |
| RequestedPrinter | PRINTING-REQUESTED PRINTER |
| Staple | LOCATIONS AND NUMBER OF STAPLES |
| RetainDuration | JOB RETAINING DURATION |
| Customer | CLIENT NAME OF JOB |
| Description | JOB RELATED DESCRIPTION |
| InputDataStream | DATA FORMAT OF INPUT FILE |
| InputFileSize | SIZE OF INPUT FILE |
| TotalPages | NUMBER OF JOB PAGES |
| TotalSheets | NUMBER OF JOB SHEETS |
| Pages stacked | NUMBER OF PAGES OUTPUT ON STACKER |
| Sheets stacked | NUMBER OF SHEETS OUTPUT ON STACKER |
| Copies stacked | NUMBER OF COPIES OUTPUT ON STACKER |
| Cumulative pages stacked | NUMBER OF PAGES INCLUDING REPRINTED PAGES OUTPUT ON STACKER |
| Cumulative sheets stacked | NUMBER OF SHEETS INCLUDING REPRINTED SHEETS OUTPUT ON STACKER |
| Assigned to printer | DATE AND TIME AT WHICH PRINTER RECEIVED JOB |
| Size | SIZE OF JOB |
| Number of reprints | NUMBER OF TIMES OF JOB REPRINTING |
| Submitted | JOB GENERATED DATE AND TIME |
| Page range | RANGE OF PAGES TO BE PRINTED |
| Folding | FOLDING INFORMATION OF JOB |
| Binding | BINDING INFORMATION OF JOB |
| OperatorInstruction | SUPPLEMENTARY TASK INFORMATION OF JOB |

FIG.15

| ITEM | CONTENT |
|---|---|
| Job ID | JOB ID |
| Job Status | JOB STATUS |
| Progress | JOB PROGRESS |
| Reason for wait | REASON FOR WAITING |
| Assigned Printer | PRINTER PERFORMING PRINTING OPERATION OF JOB |
| Completion time | EXPECTED TIME FOR COMPLETION OF PRINTING OPERATION |
| Duration | PRINTING DURATION |

PRINTING MANAGEMENT DEVICE HAVING A CAPABILITY CHANGE JOB GENERATOR, PRINTING MANAGEMENT METHOD, PRINTING SYSTEM AND RECORDING MEDIUM

BACKGROUND OF THE INVENTION

1. Field of the Invention

The disclosures discussed herein generally relate to a printing management device, a printing management method, a printing system and a computer-readable recording medium storing a printing management program.

2. Description of the Related Art

The commercial printing business refers to a particular area of work that makes a profit by generating a printout product requested from a customer based on printed matter (e.g., a catalog, and advertisement) received from the customer, and delivering the generated printout product to the customer. Such a commercial printing business involves plural processes from receiving printed matter from the customer to delivering the printout product to the customer. More specifically, the plural processes from receiving printed matter to delivering the printout product includes prepress tasks including receiving printed matter of a manuscript from the customer, receiving a printing requirement for the printout product, correcting colors, correcting a layout, correcting a binding position and the like, and postpress tasks including printing a proofreading printout for the customer to proofread a result of the prepress task, printing and subsequently binding to prepare the printout product, delivering the printout product to the customer and the like. Note that the number of processes from receiving printed matter to delivering the printout product may vary with the printing requirement for the printout product requested by the customer.

In the typical commercial printing business, a large number of orders are associated with mass-production of printout products, and hence, such printout products are mass-produced in the aforementioned processes. Further, the printing requirement for the mass-production of the printout products requested by the customer is generally inflexible in most cases. Thus, the printout products desired by the customer are generated in a printing cycle of mass-producing the printout products based on a printing requirement, changing the printing requirement into another after having printed one lot of the printout products, and mass-producing printout products based on the changed printing requirement.

In this printing cycle, the aforementioned plural processes may need to be carried out frequently when the printing requirement is changed. However, when there is no change in the printing requirement, printing may be continued in one process, thereby effectively performing mass-producing task.

A so-called "print on demand (POD) market has recently emerged in the commercial printing business. In the POD business, a relatively small lot of printing products is delivered to the customer in a short period. In the POD market, orders are placed from numerous different customers. As a result, printed matter received by the commercial printing company or printing products may have a wide variety of printing requirements in the POD market.

Further, along with a recent increase in digitization of printed matter, computers are utilized for controlling the generation of the printed matter or printout products. For example, there are proposed a technology of receiving the printed matter as electric data via a network, and a technology of controlling a workflow of the aforementioned plural processes. For example, a printing operation in the aforementioned plural processes of the workflow is defined by a job ticket called a job definition format (JDF), and the printing operation is controlled based on the JDF in the printing system.

With a change in the above-described printing environment, the commercial printing companies have promoted the computerization of the printing system in order to generate the received orders of the printed matter. In addition, the commercial printing companies have been required to construct the printing system capable of satisfying a wide variety of the printing requirements for the printout products desired by the customers. Moreover, system management, such as introducing plural printer devices and/or peripheral devices, or operational process management, such as changing the aforementioned plural processes in the relatively short cycle, may also be required in order to generate the printout products that satisfy the wide variety of the printing requirements desired by the customers.

For the commercial printing companies, however, it may be necessary to increase job efficiency further in order to make a profit despite the fact that the above management efforts are required. A technique for improving the job efficiency includes reducing a printing operation interrupting time.

The printing systems of the commercial printing companies are formed in a network environment. In the printing system of the commercial printing company (i.e., the commercial printing system), printer devices are arranged separately from a terminal that performs printing settings of the printer devices. Further, in the commercial printing system, the printer devices and the terminal may be operated by one operator.

Moreover, the commercial printing system generally employs application software for generating printout products. In the commercial printing system, a print job for each of the printout products is generally generated and managed by the application software.

The print jobs are generally generated per customer in the commercial printing system. Since the printing requirements for the printout products widely vary, the operator may need to change settings of the application software and settings of the printers for each of the print jobs in order to satisfy corresponding printing requirements.

For example, when plural customers request printout products having different sizes of sheets, the operator needs to replace the sheets with those having the desired size every time the operator receives a printing request requiring the different sized sheets from the customer.

The printer device generally includes plural paper feed parts. Accordingly, if the printers have the plural paper feed parts capable of accommodating different sized sheets, the operator does not have to replace the sheets with those having the desired size every time the operator receives a printing request requiring the different sized sheets from the customer. However, the number of paper feed parts is limited. Thus, if the number of different sheet sizes requested by the customer's printing request exceeds the number of paper feed parts of the printer device, the operator needs to replace the current sheets with those having a desired size. In this case, the printing operation needs to be interrupted while the sheets are replaced with the desired sheets.

Further, the operator does not have to replace the sheets with those having the desired size every time the operator receives a printing request requiring the different sized sheets if the printing jobs utilizing the sheets having the same size are continuously generated simultaneously in the order of sheet size. However, the operator needs to manage the print job generating order by himself or herself. In this case, the operator's workload increases as the number of printing requests increases or the number of sheet sizes increases. Note that the technique to change the job executing order is known in the art, which is disclosed, for example, in Japanese Patent Application Publication No. 9-185473 (hereinafter referred to as "Patent Document 1").

Patent Document 1: Japanese Laid-open Patent Publication No. 9-185473

In order to avoid managing the print job generating order, the processing order of the print jobs may be changed such that the print jobs utilizing the same size sheets are simultaneously processed. This may greatly reduce the printing operation interrupting time consumed for the sheet replacing task to a large extent. However, in the commercial printing system, the queuing operation may be controlled such that the queuing operation for aligning a print job in the job queue will not be performed unless the sheet sized sheets actually set in the paper feed part of the printer device matches the sheet size specified in the print job.

Thus, in the above commercial printing system, the queuing operation for aligning a print job in the job queue will not be performed unless the sheet sized sheets actually set in the paper feed part of the printer device matches the sheet size specified in the print job, and hence, a printing operation interrupting time may be required for a sheet replacement task.

SUMMARY OF THE INVENTION

It is a general object of at least one embodiment of the present invention to provide a printing management device, a printing management method, a printing system and a computer-readable recording medium storing a printing management program capable of reducing a printing operation interrupting time, which substantially eliminate one or more problems caused by the limitations and disadvantages of the related art.

In one embodiment, there is provided a non-transitory computer-readable recording medium including a printing management program, which, when processed by a computer causes the computer to function as a scheduling unit configured to schedule a print job in an image forming apparatus, the print job having a printing capability that matches a printing capability set in the image forming apparatus; and a capability change job generator configured to generate a capability change job having an instruction to change the printing capability set in the image forming apparatus. When the capability change job generated by the capability change job generator is scheduled in the image forming apparatus, the scheduling unit schedules the print job having the printing capability that matches the printing capability changed by the capability change job after the capability change job.

In another embodiment, there is provided a printing management device that includes a scheduling unit configured to schedule a print job in an image forming apparatus, the print job having a printing capability that matches a printing capability set in the image forming apparatus; and a capability change job generator configured to generate a capability change job having an instruction to change the printing capability set in the image forming apparatus. In the printing management device, when the capability change job generated by the capability change job generator is scheduled in the image forming apparatus, the scheduling unit schedules the print job having the printing capability that matches the printing capability changed by the capability change job after the capability change job.

In another embodiment, there is provided a printing management method executed by a computer. The printing management method includes scheduling a print job in an image forming apparatus, the print job having a printing capability that matches a printing capability set in the image forming apparatus; and generating a capability change job having an instruction to change the printing capability set in the image forming apparatus. When the generated capability change job is scheduled in the image forming apparatus, the print job having the printing capability that matches the printing capability changed by the capability change job is scheduled after the capability change job.

In another embodiment, there is provided a printing system that includes a printing management device and an image forming apparatus. In the printing system, the printing management device includes a scheduling unit configured to schedule a print job in the image forming apparatus, the print job having a printing capability that matches a printing capability set in the image forming apparatus; and a capability change job generator configured to generate a capability change job having an instruction to change the printing capability set in the image forming apparatus. When the capability change job generated by the capability change job generator is scheduled in the image forming apparatus, the scheduling unit schedules the print job having the printing capability that matches the printing capability changed by the capability change job after the capability change job.

In another embodiment, there is provide a printing system that includes a non-transitory computer-readable recording medium storing a printing management program; and an image forming apparatus configured to perform a printing operation based on the printing management program when executed by a processor.

Additional objects and advantages of the embodiments will be set forth in part in the description which follows, and in part will be obvious from the description, or may be learned by practice of the invention. It is to be understood that both the foregoing general description and the following detailed description are exemplary and explanatory only and are not restrictive of the invention as claimed.

BRIEF DESCRIPTION OF THE DRAWINGS

Other objects and further features of embodiments will be apparent from the following detailed description when read in conjunction with the accompanying drawings, in which:

FIG. 8 is a configuration diagram illustrating an example of a print job table;

FIG. 9 is a configuration diagram illustrating an example of a print schedule table;

FIG. 14 is a configuration diagram illustrating another example of the print job table;

FIG. 15 is a configuration diagram illustrating another example of the print schedule table;

DESCRIPTION OF THE PREFERRED EMBODIMENTS

Preferred embodiments are described below with reference to the accompanying drawings.

Figure 1:
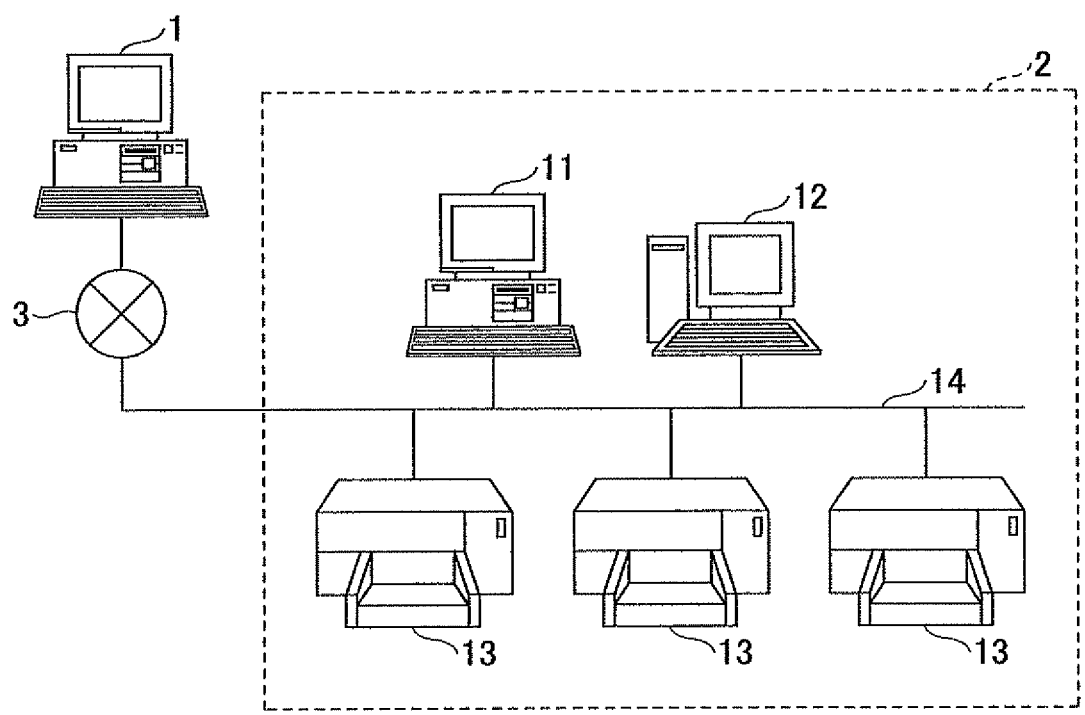
FIG. 1 is a system configuration diagram illustrating an example of a system including a printing system to which an embodiment is applied.

FIG. 1 is a system configuration diagram illustrating an example of a system including a printing system to which an embodiment is applied. The printing system in FIG. 1 includes a user client 1 and a printing system 2, which are connected via a network 3. The user client 1 is a computer utilized by a customer when the customer outsources printing operations to a commercial printing company. The printing system 2 is a system utilized by a user (an operator) of the commercial printing company.

Further, the printing system 2 includes a management client 11, a print server 12, one or more printer devices 13 and a network 14 such as a LAN. The management client 11, the print server 12 and the printer devices 13 are connected via the network 14.

The customer sends a print job including a job ticket of print target documents and print data to the print server 12. The management client 11 is a computer utilized by the user (the operator) of the commercial printing company when the operator manages the printing operations outsourced by the customer.

The operator accesses a Web user interface of the print server 12 via a Web browser to search for a print job, to start printing, to stop printing, to delete the print job, to manage the printing system 2, and the like. The print server 12 is an example of a printing management device. The print server 12 is configured to receive the print jobs of the outsourced printing operations from the user client 1 and send the print jobs to an appropriate one of the printer device 13 to print out the documents. The print server 12 is also configured to graphically display an operational status of each of the printer devices 13 in real time. The printer device 13 generates print images from the print jobs to print the print images on predetermined sheets based on the control of the print server 12.

Figure 2:
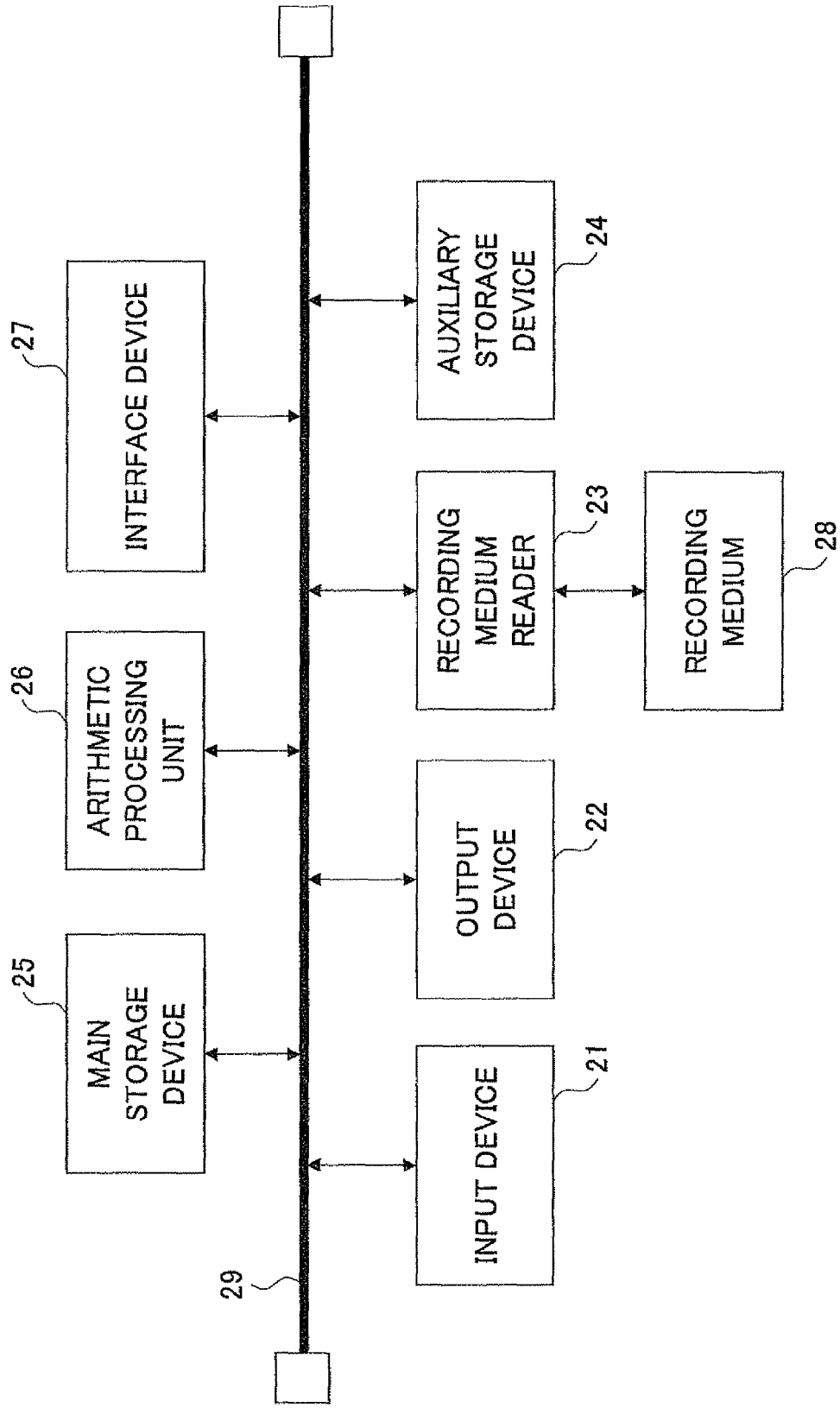
FIG. 2 is a hardware configuration diagram illustrating an example of a personal computer (PC)

For example, the print server 12 may be realized by a personal computer (PC) 20 having a hardware configuration illustrated in FIG. 2. FIG. 2 is a hardware configuration diagram illustrating an example of the PC 20. The PC 20 includes an input device 21, an output device 22, a recording medium reader 23, an auxiliary storage device 24, a main storage device (i.e., memory) 25, an arithmetic processing unit 26, and an interface device 27, which are connected to one another via a bus 29.

The input device 21 may be a keyboard, a mouse or the like. The input device 21 is utilized for inputting various signals. The output device 22 may be a display device or the like. The output device 22 is utilized for displaying various windows, data and the like. The interface device 27 may be a modem, a LAN card or the like. The interface device 27 is utilized for connecting the PC 20 to the network 14.

A printing management program installed on the print server 12 corresponds to at least one of various programs that control the PC 20. The printing management program may be provided by the distribution of a recording medium 28 or being downloaded via the network 14 or the like.

Various types of recording media may be used as the recording medium 28. Examples of the recording medium 28 include a recording medium such as a CD-ROM, a flexible disk and a magneto-optical disk on which information is optically, electrically or magnetically recorded; or a semiconductor memory such as a ROM or a flash memory on which information is electrically recorded.

When the recording medium 28 storing the printing management program is placed in the recording medium reader 23, the design program is installed in the auxiliary storage device 24 from the recording medium 28 via the recording medium reader 23. The printing management program downloaded via the network 14 or the like is installed in the auxiliary storage device 24 via the interface device 27.

The auxiliary storage device 24 stores the installed printing management program, desired files, data and the like. The main storage device 25 stores the printing management program retrieved from the auxiliary storage device 24 at the startup of the printing management program. The arithmetic processing unit 26 realizes various types of processes described later in accordance with the printing management program stored in the main storage device 25.

[First Embodiment]

Figure 3:
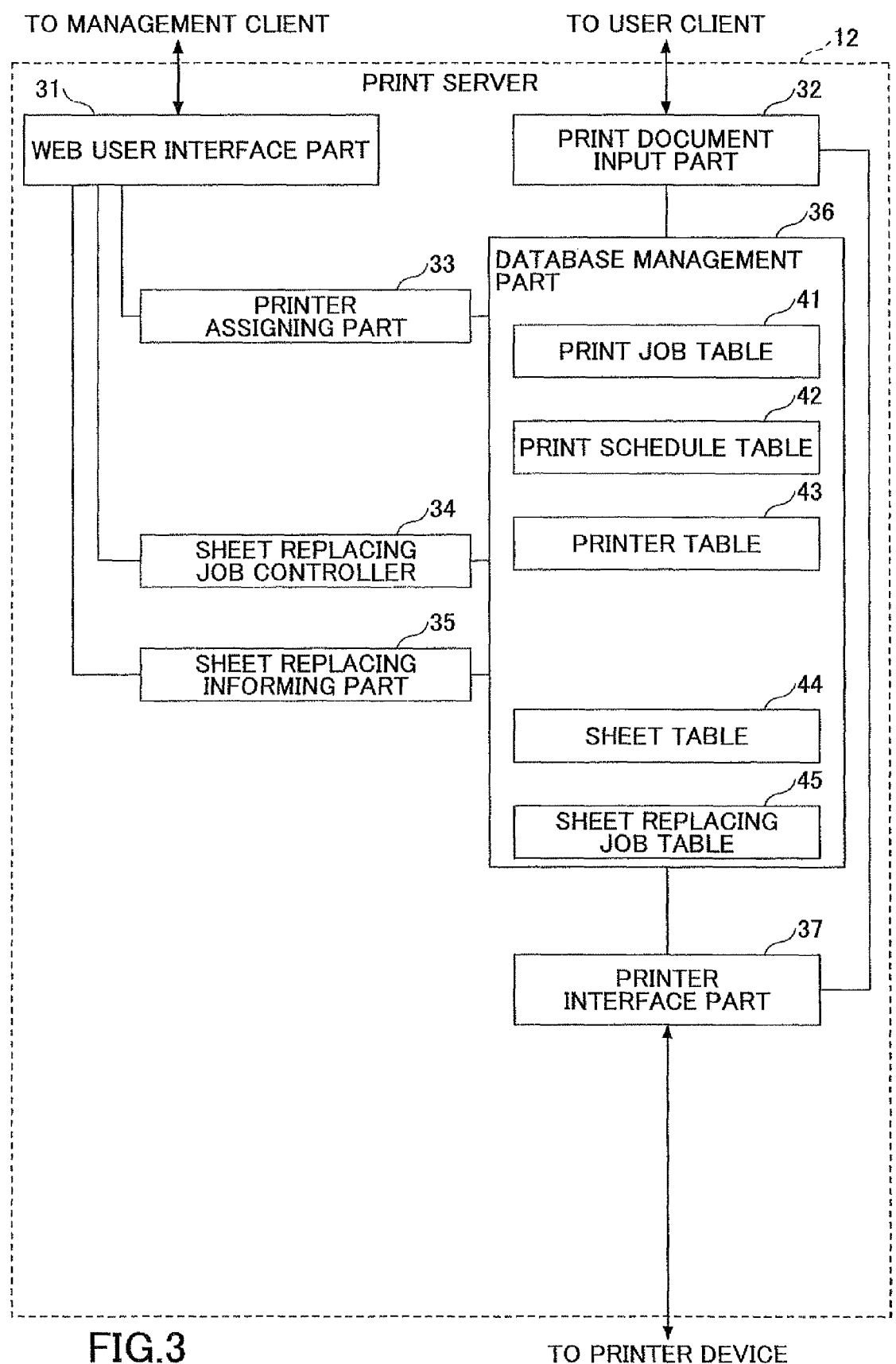
FIG. 3 is a process block diagram illustrating an example of a print server.

The print server 12 may be realized by process blocks illustrated in FIG. 3. FIG. 3 is a process block diagram illustrating an example of the print server 12. The print server 12 has installed the printing management program. The print server 12 executes the printing management program to implement functions of a web user interface part 31, a print document input part 32, a printer assigning part 33, a sheet replacing job controller 34, a sheet replacement informing part 35, a database management part 36 and a printer interface part 37.

The web user interface part 31 is configured to control the communications with the management client 11. The web user interface part 31 is configured to receive from the management client 11 requests to search for a document such as a print target document, to start printing, to stop printing, to delete the document and to manage the printing system 2 and the like.

The print document input part 32 receives a print job including a job ticket of print target documents and print data from the user client 1. The print document input part 32 registers information on the received print jobs in the database management part 36. The print jobs registered in the database management part 36 are scheduled in the printer device 13 such that the printer device 13 executes the scheduled print jobs to perform printing.

The database management part 36, for example, includes a print job table 41, a print schedule table 42, a printer table 43, a sheet table 44 and a sheet replacing job table 45.

The database management part 36 receives a request from the print document input part 32, the printer assigning part 33, the sheet replacing job controller 34, the printer interface part 37 or the like to write data in the print job table 41, the print schedule table 42, the printer table 43, the sheet table 44 and the sheet replacing job table 45.

The print job table 41 is configured to retain information on the print jobs received from the user client 1. Note that details of the print job table 41 are described later. The print schedule table 42 is configured to retain information on the expected printer device 13 ready to execute the print jobs, a current status of each of the print jobs and a status of the sheet replacing job information retained in the sheet replacing job table 45. Details of the print schedule table 42 are described later.

The printer table 43 is configured to retain information on the connections of the printer devices 13 such as IP addresses, and statuses of the printer devices 13. The sheet table 44 is configured to retain information (a current value) on a sized sheets currently set in the paper feed tray 13. The sheet replacing job table 45 is configured to retain information on the later-described sheet replacing job.

The printer interface part 37 is configured to control communications with the printer devices 13. The printer interface part 37 searches for a subsequently predetermined print job by referring to the print schedule table 42 every time a report indicating that the preceding print job has been completed has been received from the corresponding printer device 13. Next, on finding the subsequently predetermined print job, the printer interface part 37 acquires details of the print job from the print job table 41.

The printer interface part 37 sends the print job held in the print document input part 32 to the corresponding printer device 13 based on the details of the acquired print job. Further, when the printer interface part 37 starts searching for the print job, the printer interface part 37 waits to receive from the printer device 13 a report including the sheet size information on the sheets actually set in the paper feed part of the printer device 13.

The printer interface part 37 is further configured to receive status information on the printer devices 13 from the corresponding printer devices 13 at predetermined intervals. If the printer interface part 37 acknowledges one or more of the printer devices 13 have changed their statuses, the printer interface part 37 requests the database management part 36 to replace the status information of the corresponding printer device 13 retained in the printer table 43 with the new status information (i.e., changed status information). The printer interface part 37 determines a status of the print job based on the status of the corresponding printer device 13, and requests the database management part 36 to update the status of each of the print jobs retained in the print schedule table 42.

The printer assigning part 33 is configured to be responsible for assignment of the print jobs to the printer devices 13. The printer assigning part 33 assigns a print job to a corresponding one of the printer devices 13 based on attributes of the print job and attributes of the printer devices 13, either manually or automatically.

The sheet replacing job controller part 34 receives respective specified sheet sizes before and after the sheet replacement via the web user interface part 31 from the operator. The sheet replacing job controller part 34 then generates the later-described sheet replacing job based on the received information on the specified sheet sizes before and after the sheet replacement. Further, the sheet replacing job controller part 34 registers the generated information on the received print job in the print job table 41. When the sheet replacing job in the processing order of jobs in the job queue is processed, the sheet replacement informing part 35 sends a sheet replacing notice to invite the operator to replace the sheets via the web user interface part 31 from the operator.

Note that when the print server 12 executes plural print jobs, the print server 12 performs queuing control. The queuing control is defines as a printing operation in which plural print jobs are queued in the order of a subsequently received print job being aligned after a previously received print job, and are continuously printed in that order. That is, the queuing control is based on a queuing operation in which the later received print job is aligned after the previously received print job. However, at the same time, the queuing control allows rearrangement of the print jobs or interrupting the print job. The queuing control manages not only the print jobs but also the sheet replacing job.

Hereinafter, a typical queuing control method without having a sheet replacing job is described for facilitating the understanding of the queuing control. Note that the print schedule table 42 of the database management part 36 manages the print jobs in two statuses, namely, a received status when the print job is received and a scheduled status when the print job is scheduled in the printer device 13.

The transition from the received status to the scheduled status of the print job is performed when the sheet sized sheets actually set in the paper feed part of the printer device 13 matches the sheet size specified in the print job.

Figure 4:
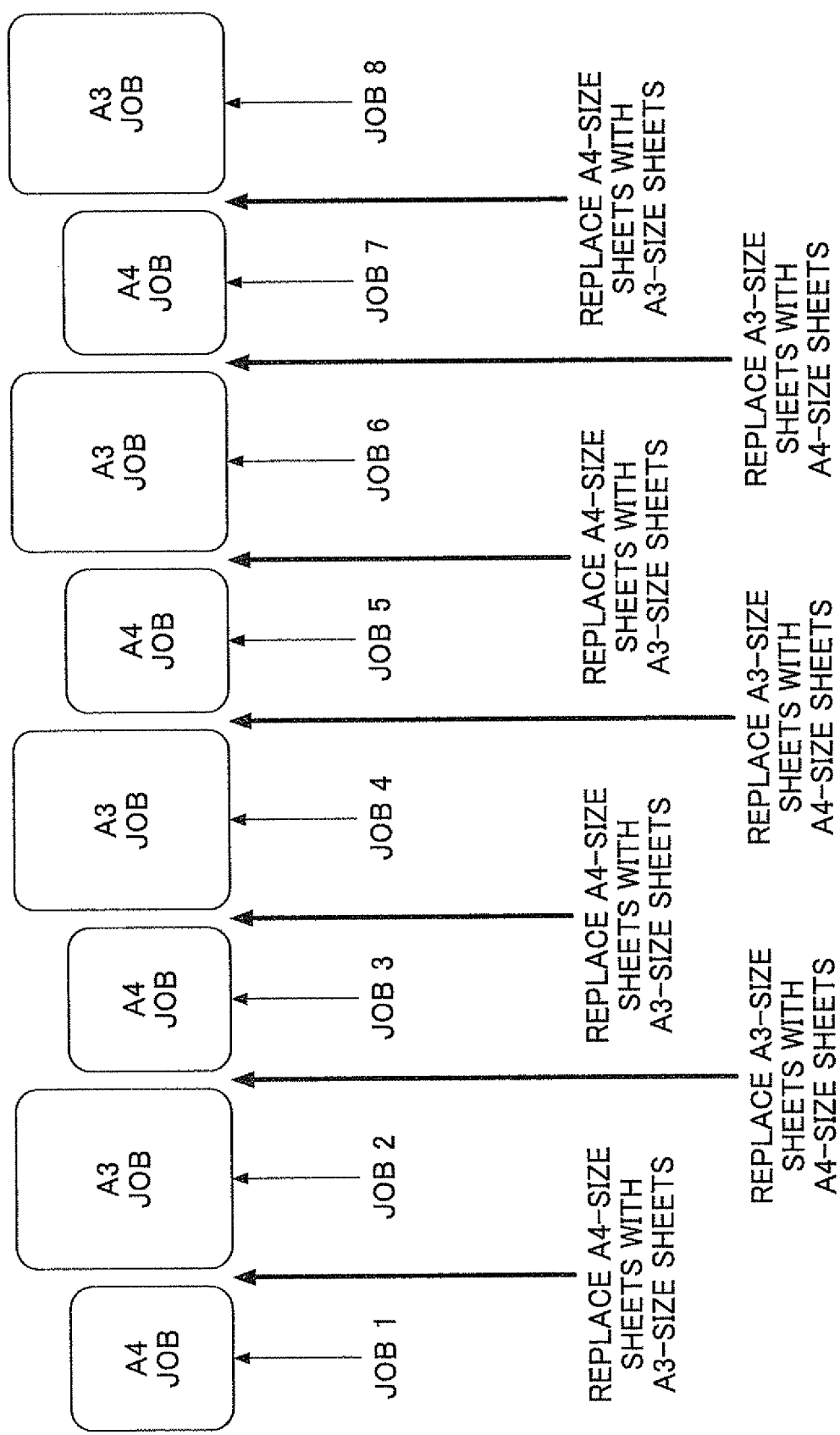
FIG. 4 is a diagram illustrating a typical job queue status without introducing a sheet replacing job in the job queue.

FIG. 4 is a diagram illustrating a typical job queue status without introducing a sheet replacing job in a job queue. FIG. 4 illustrates a job queue composed of a total number of 8 print jobs introduced in the order from "JOB 1" to "JOB 8". As illustrated in FIG. 4, A4-size sheets are specified in odd-ordinal number print jobs to perform printing operations. Likewise, A3-size sheets are specified in even-ordinal number print jobs to perform printing operations. In general, a subsequently introduced print job is queued (aligned) after the previously introduced job. In the first embodiment, the print jobs of printing on the A4-size sheets and the print jobs of printing on the A3-size sheets are alternately queued by repeating the above queuing operation.

The queuing operation is performed when the sheet sized sheets actually set in the paper feed part of the printer device 13 matches the sheet size specified in the print job. Accordingly, in order to perform printing operations of all the print jobs illustrated in FIG. 4 by utilizing the printer device 13 having only one paper feed part, the operator needs to exchange the sized sheets from a A4-size to a A3 size or from a A3-size to a A4 size (i.e., a sheet replacing task) every time the operator has been informed of the completion of one print job. This interrupts the printing operation for a longer time (i.e., the printing operation interrupting time is increased).

Figure 5:
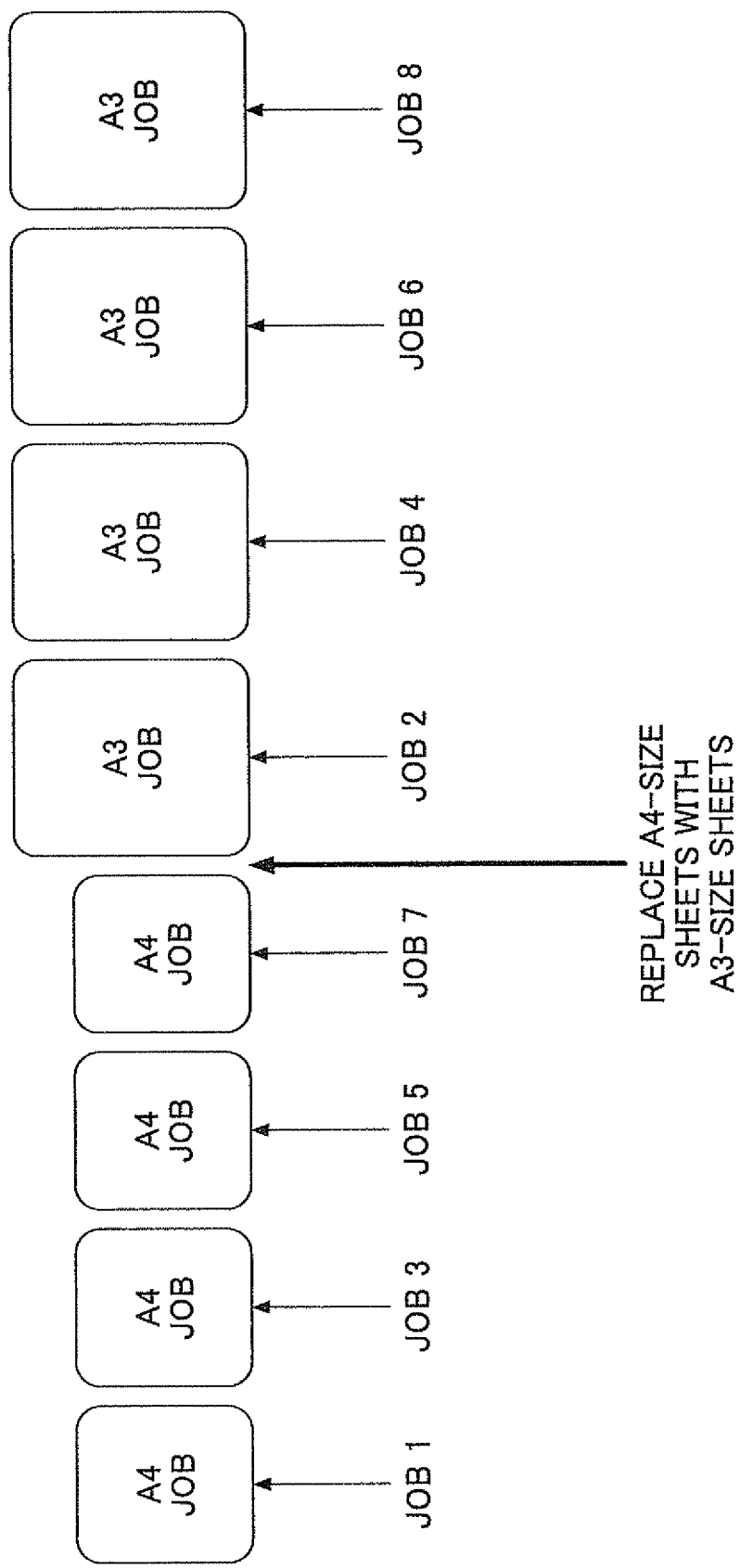
FIG. 5 is a diagram illustrating a preferred job queue status.

FIG. 5 is a diagram illustrating a preferred job queue status. If the eight jobs illustrated in FIG. 4 are continuously introduced in the processing order of jobs in the job queue illustrated in FIG. 5, four print jobs of printing on the A4-size sheets are simultaneously (i.e., continuously) aligned as a group in the job queue. In FIG. 5, the operator needs to replace the A4-size sheets with the A3-size sheets after completion of the four print jobs of printing on the A4-size sheets has been reported. Thereafter, the four print jobs of printing on the A3-size sheets are simultaneously (i.e., continuously) aligned as a group in the job queue as illustrated in FIG. 5. Accordingly, the operator needs to perform only one sheet replacing task to replace the A4-size sheets with the A3-size sheets. This may reduce the printing operation interrupting time.

Figure 6:
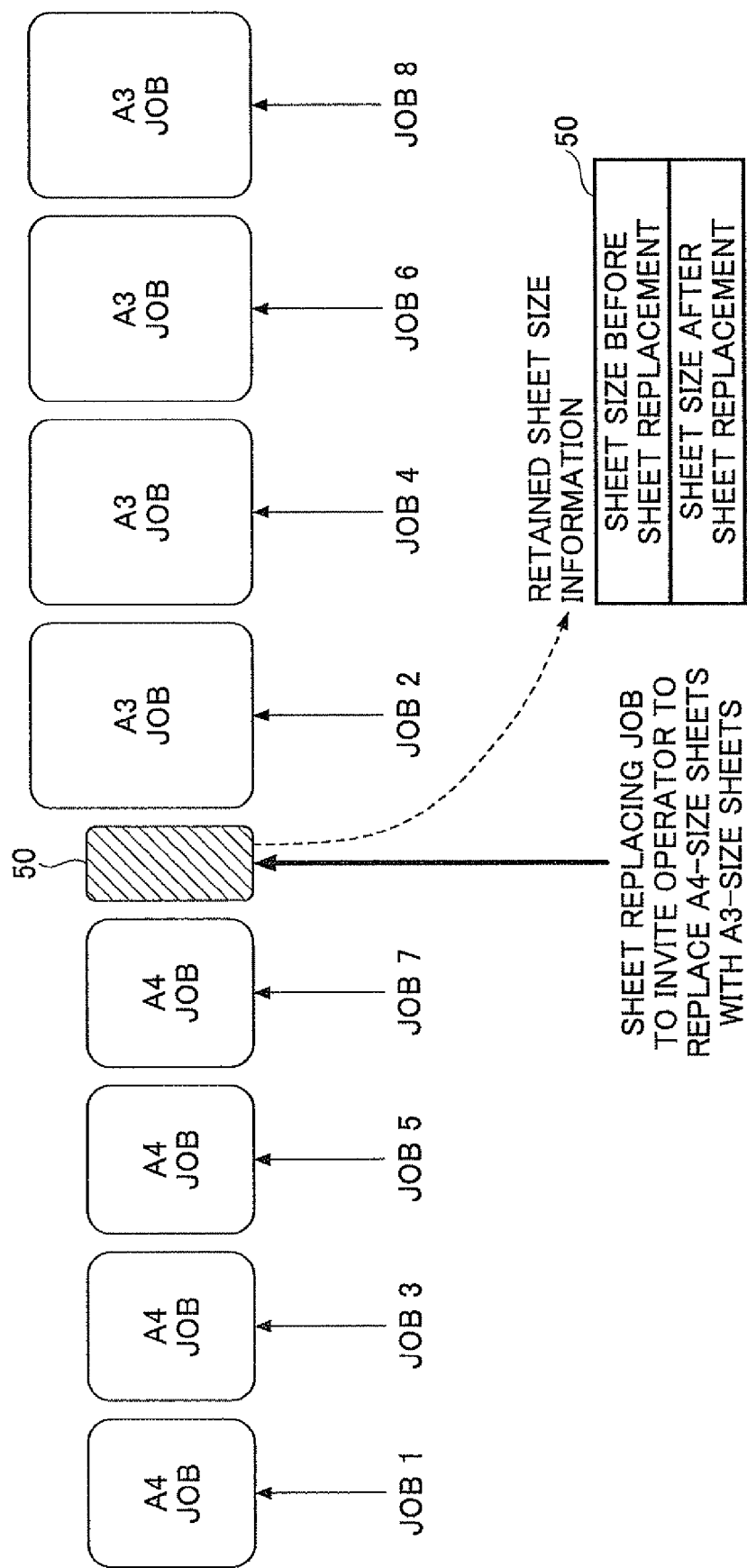
FIG. 6 is a diagram illustrating a job queue status with a sheet replacing job introduced in the job queue.

In the first embodiment, a sheet replacing job is utilized for implementing the job queue status illustrated in FIG. 5. FIG. 6 is a diagram illustrating a job queue status where a sheet replacing job 50 is introduced in the job queue. In FIG. 6, after the four print jobs of printing on the A4-size sheets have been simultaneously (i.e., continuously) executed, the sheet replacing job 50 is executed for inviting the operator to replace the A4-size sheets with the A3-size sheets. When the sheet replacing job 50 is executed, the operator is invited to replace the A4-size sheets with the A3-size sheets (i.e., the sheet replacing task). In FIG. 6, after the operator has replaced the A4-size sheets with the A3-size sheets, the four print jobs of printing on the A4-size sheets are simultaneously (i.e., continuously) performed.

As illustrated in FIG. 6, the sheet replacing job 50 is executed between the print job of printing on the A4-size sheets and the print job of printing on the A3-size sheets; that is, the sheet replacing job 50 is executed at an interval where the sheet size specified in the print job is changed from the A4-size to the A3 size. Since the sheet replacing job 50 is executed at this interval, the operator may be capable of being informed of the necessity of the sheet replacement. As a technique to inform the operator of the necessity of the sheet replacement, an alert screen may be displayed on the display device of the management client 11 and the print server 12, or an alert may be displayed on the operations panel of the printer device 13.

The sheet replacing job 50 includes sheet information including a sheet size before the sheet replacement and a sheet size after the sheet replacement. In the print server 12, the sheet replacing job controller 34 is provided with a function to allow the operator to set the sheet size before the sheet replacement and the sheet size after the sheet replacement via a user interface (UI). With this configuration, the settings and the information of the sheet size before the sheet replacement and the sheet size after the sheet replacement may be retained.

Note that as described above, in the typical print job queuing, the queuing operation is not performed unless the sheet sized sheets actually set in the paper feed part of the printer device 13 matches the sheet size specified in the print job. In the print job queuing in the first embodiment, the queuing operation is performed if the sheet size after the sheet replacement retained in the sheet replacing job 50 matches the sheet size specified in the print job, despite the fact that the sheet sized sheets actually set in the paper feed part of the printer device 13 does not match the sheet size specified in the print job.

Thus, the sheet replacing job 50 serves as a complementary function of the sheet size information (i.e., current value) of the sheets actually set in the paper feed part of the printer device 13. Further, the information on the sheet size after the sheet replacement retained in the sheet replacing job 50 serves as complementary information of the sheet size information of the sheets actually set in the paper feed part of the printer device 13.

In the first embodiment, since the sheet replacing job 50 serves as the complementary function of the sheet size information (i.e., current value) of the sheets actually set in the paper feed part of the printer device 13, the print jobs are queued as illustrated in FIG. 6.

Figure 7:
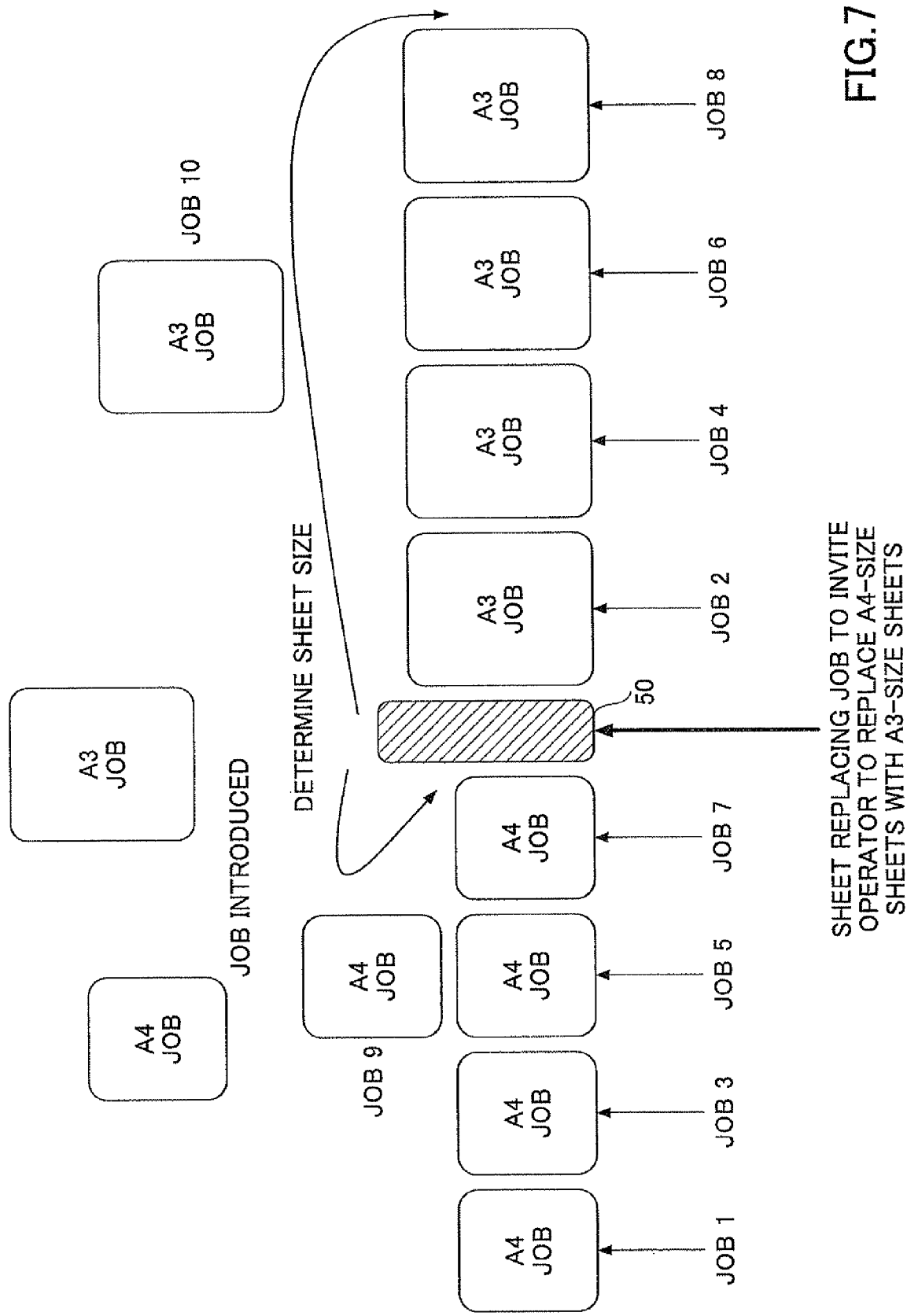
FIG. 7 is a diagram illustrating a job queue status when new print jobs are introduced in the job queue.

FIG. 7 illustrates a job queue status when a print job 9 of printing on the A4-size sheets and a print job 10 of printing on the A3-size sheets are newly introduced into the print job queue illustrated in FIG. 6. FIG. 7 is a diagram illustrating a job queue status when the print jobs (job 9 and job 10 in this case) are newly introduced in the job queue.

The sheet size specified in each of the newly introduced print jobs is compared with the sheet sizes before and after the sheet replacement retained in the sheet replacing job 50, and whether each of the newly introduced jobs is to be queued before or after the sheet replacing job 50 is determined based on the comparison result.

If it is determined that the newly introduced job is to be queued before the sheet replacing job 50 in the job queue, the newly introduced job is aligned after (behind) the last one of the print jobs queued before the sheet replacing job 50 in the job queue (i.e., the newly introduced job is the last job in an A4-size sheet printing sub-queue). In the example of FIG. 7, when the job 9 is introduced, the job 9 is aligned after (behind) the job 7 in the A4-size sheet printing sub-queue.

If it is determined that the newly introduced job is to be queued after the sheet replacing job 50, the newly introduced job is aligned after (behind) the last one of the print jobs queued after the sheet replacing job 50 (i.e., the newly introduced job is the last job in an A3-size sheet printing sub-queue). In the example of FIG. 7, when the job 10 is introduced, the job 10 is aligned after the job 8 in the A3-size sheet printing sub-queue. As described above, the sheet replacing job 50 serves as a scheduler function to schedule (sort) the print jobs.

FIG. 8 is a configuration diagram illustrating an example of the print job table 41. The print job table 41 includes items associated with following corresponding contents, which are a job ID, a job name, the number of copies, application of duplex printing, a job sheet, a job output location, locations and number of punch holes, a printing-requested printer, locations and number of staples, job retaining duration, a client name of job, a job related description, a data format of an input file, a size of the input file, the number of job pages, the number of job sheets, the number of pages output on a stacker, the number of sheets output on the stacker, the number of copies output on the stacker, the number of pages including reprinted pages output on the stacker, the number of sheets including the reprinted sheets output on the stacker, date and time at which the printer received job, a size of a job, the number of times of job reprinting, job generated date and time, a range of pages to be printed, folding information of the job and binding information of the job.

FIG. 9 is a configuration diagram illustrating an example of the print schedule table 42. The print schedule table 42 includes items associated with following corresponding contents, which are a job ID, a job status, job progress, a reason for waiting, an actually assigned printer, an expected printer, a printing order and a printing-requested printer.

Figure 10:
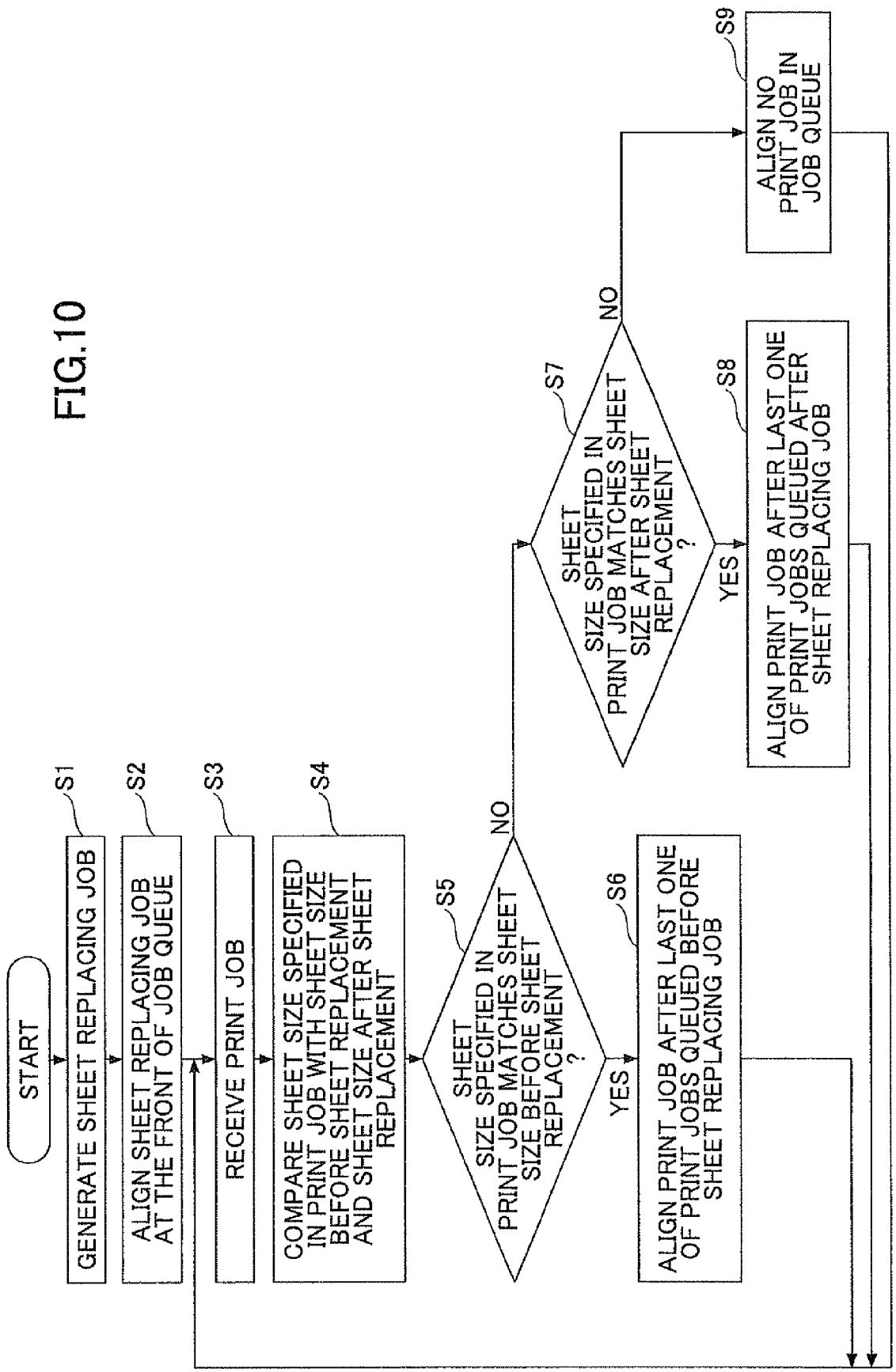
FIG. 10 is a flowchart illustrating an example of a queuing operation utilizing the sheet replacing job.

FIG. 10 is a flowchart illustrating an example of a queuing operation utilizing the sheet replacing job. Note that a procedure for the operator to generate a sheet replacing job 50 is described later. Note also that the most frequently utilized case is described with reference to FIG. 10, in which the sheet replacing job 50 is introduced in a job queue before the operator introduces a print job, and only the sheets having the sheet size retained in the sheet replacing job 50 are set in the paper feed part of the printer device 13.

In step S1, the sheet replacing job controller part 34 receives a generating task to generate the sheet replacing job 50 from the operator via the web user interface part 31. The sheet replacing job controller part 34 receives respective specified sheet sizes before and after the sheet replacement via the web user interface part 31 from the operator to generate the sheet replacing job 50 based on the received information on the sheet sizes before and after the sheet replacement.

In step S2, the sheet replacing job controller part 34 updates the print schedule table 42 and the sheet replacing job table 45 so as to align the sheet replacing job 50 at the front of the job queue.

In step S3, the print document input part 32 receives a print job from the user client 1. The print document input part 32 registers information on the received print job in the print job table 41.

In step S4, the printer assigning part 33 compares the sheet size specified in the received print job with the sheet sizes before and after the sheet replacement retained in the sheet replacing job 50.

In step S5, the printer assigning part 33 determines whether the sheet size specified in the received print job matches the sheet sizes before and after the sheet replacement retained in the sheet replacing job 50.

In step S5, if the sheet size specified in the received print job matches the sheet size before the sheet replacement retained in the sheet replacing job 50, the printer assigning part 33 updates the print schedule table 42 so as to align the received print job after the last one of the print jobs queued before the sheet replacing job 50 in the job queue in step S6.

If there is no print job before the sheet replacing job 50 in the job queue, the print job received in step S3 is aligned (queued) at the front of the job queue. If, on the other hand, there is one or more print jobs queued before the sheet replacing job 50 in the job queue, the print job received in step S3 is aligned (queued) after (behind) the last one of the print jobs queued before the sheet replacing job 50 in the job queue.

If the sheet size specified in the received print job does not match the sheet size before the sheet replacement, the printer assigning part 33 determines whether the sheet size specified in the received print job matches the sheet size after the sheet replacement retained in the sheet replacing job 50.

If the sheet size specified in the received print job matches the sheet size after the sheet replacement retained in the sheet replacing job 50, the printer assigning part 33 updates the print schedule table 42 so as to align the received print job after (behind) the last one of the print jobs queued after the sheet replacing job 50 in the job queue in step S8.

If there is no print job after (behind) the sheet replacing job 50 in the job queue, the print job received in step S3 is aligned (queued) immediately after (behind) the sheet replacing job 50 in the job queue. If, on the other hand, there is one or more print jobs queued after (behind) the sheet replacing job 50 in the job queue, the print job received in step S3 is aligned (queued) after (behind) the last one of the print jobs queued after the sheet replacing job 50 in the job queue.

If the sheet size specified in the received print job does not match the sheet size after the sheet replacement retained in the sheet replacing job 50, the printer assigning part 33 will not align any print job in the queue in step S9. In the flowchart of the queuing operation illustrated in FIG. 10, the queuing operation returns to the process in step S3 after the processes in steps S6, S8 and S9, and then waits for processing of a next print job.

Figure 11:
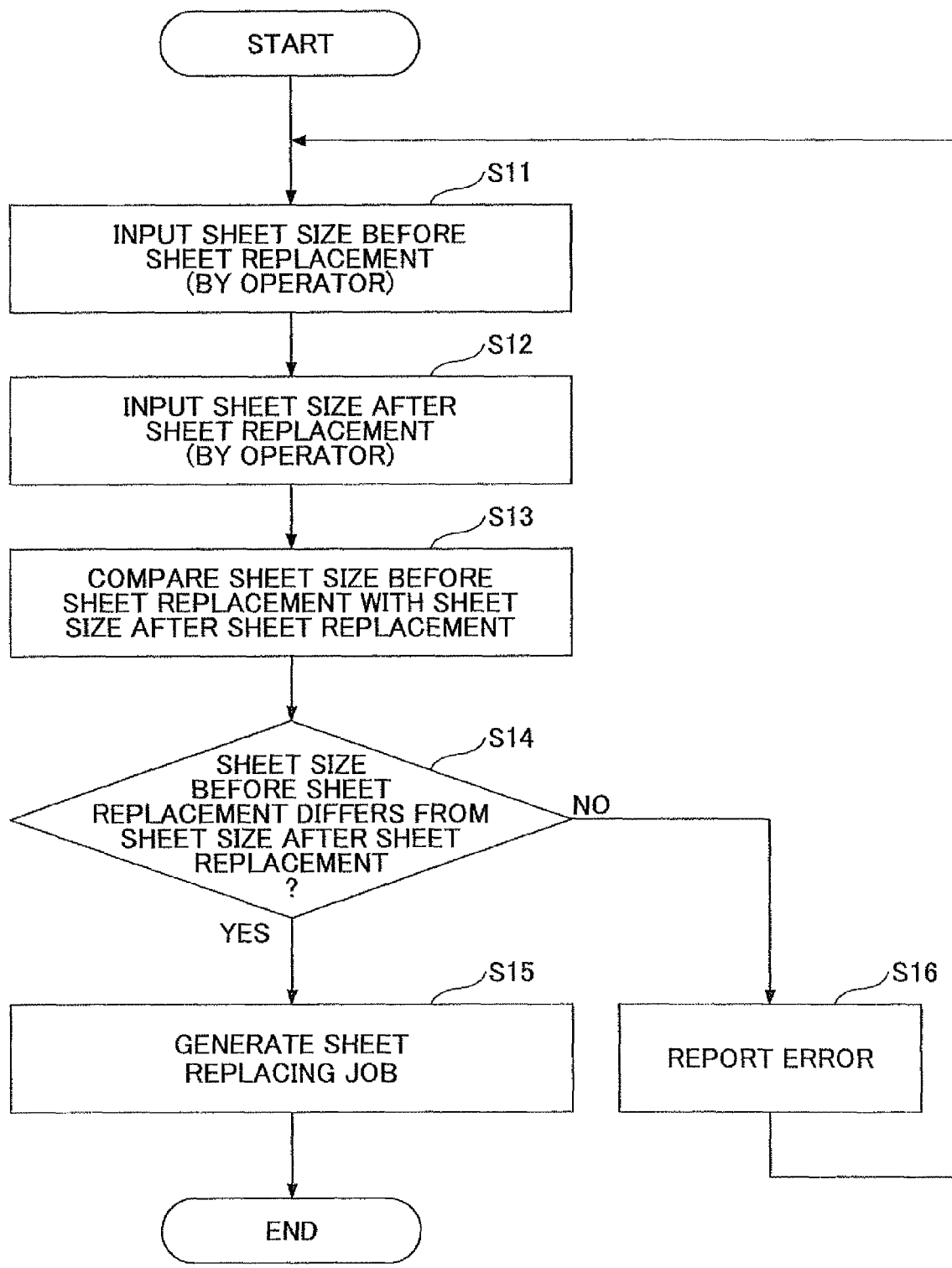
FIG. 11 is a flowchart illustrating an example of a sheet replacing job generating procedure.

FIG. 11 is a flowchart illustrating an example of a sheet replacing job generating procedure. The sheet replacing job controller 34 provides the operator a method for generating the sheet replacing job 50. As mentioned earlier, the sheet replacing job 50 includes sheet information including the sheet size before the sheet replacement and the sheet size after the sheet replacement. Since the sheet size before the sheet replacement and the sheet size after the sheet replacement may be optionally settable, the sheet replacing job controller 34 provided the operator a sheet information setting UI.

On receiving the sheet information setting UI, the operator inputs a desired sheet size before the sheet replacement and a desired sheet size after the sheet replacement via the sheet information setting UI. In step S11, the sheet replacing job controller 34 receives the sheet size before the sheet replacement and the sheet size after the sheet replacement input by the operator from the sheet information setting UI.

In step S12, the sheet replacing job controller 34 receives the sheet size before the sheet replacement and the sheet size after the sheet replacement input by the operator from the sheet information setting UI.

In step S13, the sheet replacing job controller 34 compares the sheet size before the sheet replacement received in step S11 and the sheet size after the sheet replacement received in step S12. As mentioned earlier, the technique for aligning the print jobs before and after the sheet replacing job 50 is utilized in a case where the sheet size before the sheet replacement differs from the sheet size after the sheet replacement.

In step S14, if the sheet size before the sheet replacement received in step S11 differs from the sheet size after the sheet replacement received in step S12, the sheet replacing job controller 34 generates the sheet replacing job 50 in step S15.

Note that in step S14, if the sheet size before the sheet replacement received instep S11 does not differ from the sheet size after the sheet replacement received in step S12, the sheet replacing job controller 34 will not generate the sheet replacing job 50 in step S15 but will report it as an error to the operator in step S16. Thus, improper generation of the sheet replacing job 50 may be prevented in this manner. In the flowchart of the queuing operation illustrated in FIG. 11, the queuing operation returns to the process in step 11 after the processes in step S16, and then waits for the sheet sizes before the sheet replacement and after the sheet replacement being input by the operator.

Since the sheet replacing job 50 operates as a job, the sheet replacing job 50 includes a data structure retaining necessary information. The data structure of the sheet replacing job 50 may vary with different methods or systems for inviting the operator to replace the sheets. For example, if the sheet replacing notice is desired to be displayed as a popup screen, the data format may be converted to the data format of the management client 11 or the print server 12.

Further if the sheet replacing notice is desired to be displayed on an operations panel of the printer device 13, the data format may be converted into that suitable for being displayed at an engine interface or the like between the printer device 13 and the print server 12. Since the sheet replacing job 50 exists as one of the data items in any of the systems or methods of displaying the sheet replacing notice, a user may be able to perform an operation to delete the sheet replacing job 50 itself and change the sheet size.

Figure 12:
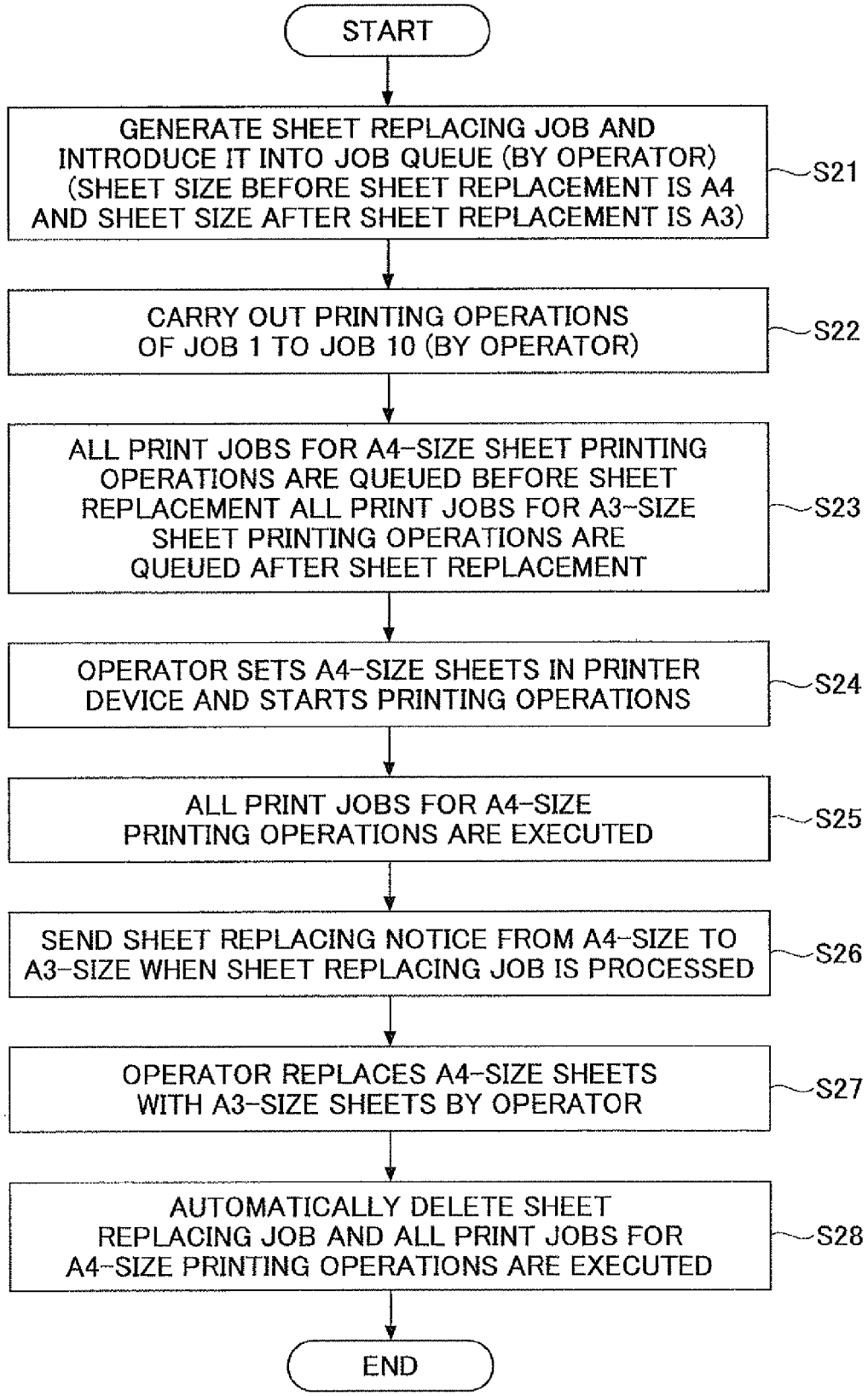
FIG. 12 is a flowchart illustrating an example of a print job printing operation utilizing the sheet replacing job.

FIG. 12 is a flowchart illustrating an example of a print job printing operation utilizing the sheet replacing job. Note that in FIG. 12, the aforementioned example is utilized due to existence of numerous patterns of the print job printing operations in practical operations.

In step 21, the sheet replacing job controller part 34 receives respective specified sheet sizes before and after the sheet replacement via the web user interface part 31 from the operator to generate the sheet replacing job 50 based on the received information on the sheet sizes before and after the sheet replacement. In this example, it is assumed that the sheet size before the sheet replacement is the A4-size, and the sheet size after the sheet replacement is the A3-size.

In step S22, the print document input part 32 receives a printing request for executing a print job from the user client 1. In this example, it is assumed that the print document input part 32 has received the printing request for executing jobs from "job 1" to "job 10" from the operator. Note that, the A4-size sheets are specified in odd-ordinal number print jobs to perform printing operations as a printing requirement.

Likewise, the A3-size sheets are specified in even-ordinal number print jobs to perform printing operations as the printing requirement.

In step S23, five print jobs for the A4-size sheet printing operations are queued before (in front of) the sheet replacing job 50 in the processing order illustrated in the flowchart of FIG. 12. Similarly, five print jobs for the A3-size printing sheet operations are queued after (behind) the sheet replacing job 50.

In step S24, the operator sets the sheets of the A4-size that is a sheet size before the sheet replacement in the paper feed part of the printer devices 13. The printer interface part 37 receives a report indicating that the A4-size sheets have been set in the paper feed part of the printer devices 13 from the printer device 13.

When the printer interface part 37 has received the report indicating that the A4-size sheets have been set in the paper feed part of the printer devices 13 from the printer device 13, the printer interface part 37 executes the five print jobs for the A4-size sheet printing operations queued before (in front of) the sheet replacing job 50. That is, the A4-size printing operations of the five print jobs are executed by the printer device 13.

After the A4-size printing operations of the five print jobs have been completed, the printing operation performed by the printer device 13 is interrupted. In step 26, when the sheet replacing job 50 in the job queue is processed, the sheet replacing job controller part 35 sends the sheet replacing notice to invite the operator to replace the A4-size sheets with the A3-size sheets.

In step S27, the operator sets the sheets of the A3-size that is a sheet size after the sheet replacement in the paper feed part of the printer devices 13. That is, the operator changes the A4-size sheets set in the paper feed part of the printer devices 13 into the A3-size sheets. The printer interface part 37 receives a report indicating that the A3-size sheets have been set in the paper feed part of the printer devices 13 from the printer device 13. While the printer interface part 37 performs communications with the printer device 13 at regular intervals, the printer interface part 37 receives the report indicating that the A3-size sheets have been set in the paper feed part of the printer devices 13 from the printer device 13.

In step S28, when the operator sets the A3-size sheets in the paper feed part of the printer devices 13, the sheet replacing job controller 34 deletes the sheet replacing job 50. The printer interface part 37 executes the five print jobs for the A3-size sheet printing operations queued after (behind) the sheet replacing job 50. That is, the A3-size printing operations of the five print jobs are executed by the printer device 13.

In the first embodiment, the sheet replacing task may be reduced by generating the sheet replacing job 50 for inviting the operator to replace which size of sheets with which size of sheets in order to process the sheet replacing job 50 as one of the print jobs in the job queue. Thus, since the sheet replacing job 50 is processed as one of the print jobs in the job queue, the sheet replacing job 50 may be interposed into any position among the print jobs in the job queue. Accordingly, the sheet replacing job 50 maintains the sheet information including the sheet size before the sheet replacement and the sheet size after the sheet replacement based on which the printing operations of the print jobs are performed. That is, the sheet replacing job controller 50 is executed for allowing the operator to perform the sheet replacement.

Accordingly, even if the sheet size information held by the print job group queued before (behind) the sheet replacing job 50 differs from the sheet size information held by the print job group queued after (in front of) the sheet replacing job 50, the operator is invited to replace the sheets of different sizes by executing the sheet replacing job 50, in the first embodiment.

When the operator replaces the sheets, the sheet size information of the sheets actually set in the paper feed part of the printer device 13 will match the sheet size information of the sheets held in the print job group of the print jobs are queued after the sheet replacing job 50. Further, the sheet replacing job 50 may be interposed into any position among the print jobs in the job queue. Accordingly, if the operator acknowledges in advance that plural print jobs to be executed include different sizes of the sheets to print out the sheets of different sizes, the sheet replacing job 50 may be introduced before the sheet replacing task is requested so as for the operator to perform the sheet replacement.

Further, in the first embodiment, the queuing operation for aligning a print job in the job queue may be performed even if the sheet sized sheets actually set in the paper feed part of the printer device does not match the sheet size specified in the print job.

Thus, in the first embodiment, the order of the print jobs to be processed is automatically changed, and hence the operator may no longer need to change the order of the print jobs to be processed. As a result, the number of the processes in the sheet replacing task may be reduced. Further, the operator may be able to replace the sheets when the operator receives the sheet replacing notice. In the first embodiment, even if the sheet sized sheets actually set in the paper feed part of the printer device does not match the sheet size specified in the print job, the print job may be queued in the job queue. Accordingly, the print jobs in the entire print system may be more effectively processed.

Note that the sheet replacing job 50 for the sheet replacing task is illustrated as one example; however, any tasks may be processed in a manner similar to the sheet replacing job 50. For example, a finisher replacing job may be implemented in a manner similar to the sheet replacing job 50. The finisher replacing job involves inviting the operator to replace a punching device to implement a punching function with a stapler to implement a stapling function when a print job utilizing the punching function is switched to a print job utilizing the stabling function.

[Second Embodiment]

The number of supplementary tasks accompanying the print jobs performed by the operator such as a preprocess task or a post process task other than the sheet replacing task is being increased. The operator may have to perform the preprocess task, the post process tasks and the sheet replacing task accurately and efficiently by switching these tasks based on the printing schedule. In the first embodiment, content of the supplementary task is reported to the operator via the sheet replacing job 50. In the second embodiment, the content of the supplementary task is reported to the operator via another example method.

Figure 13:
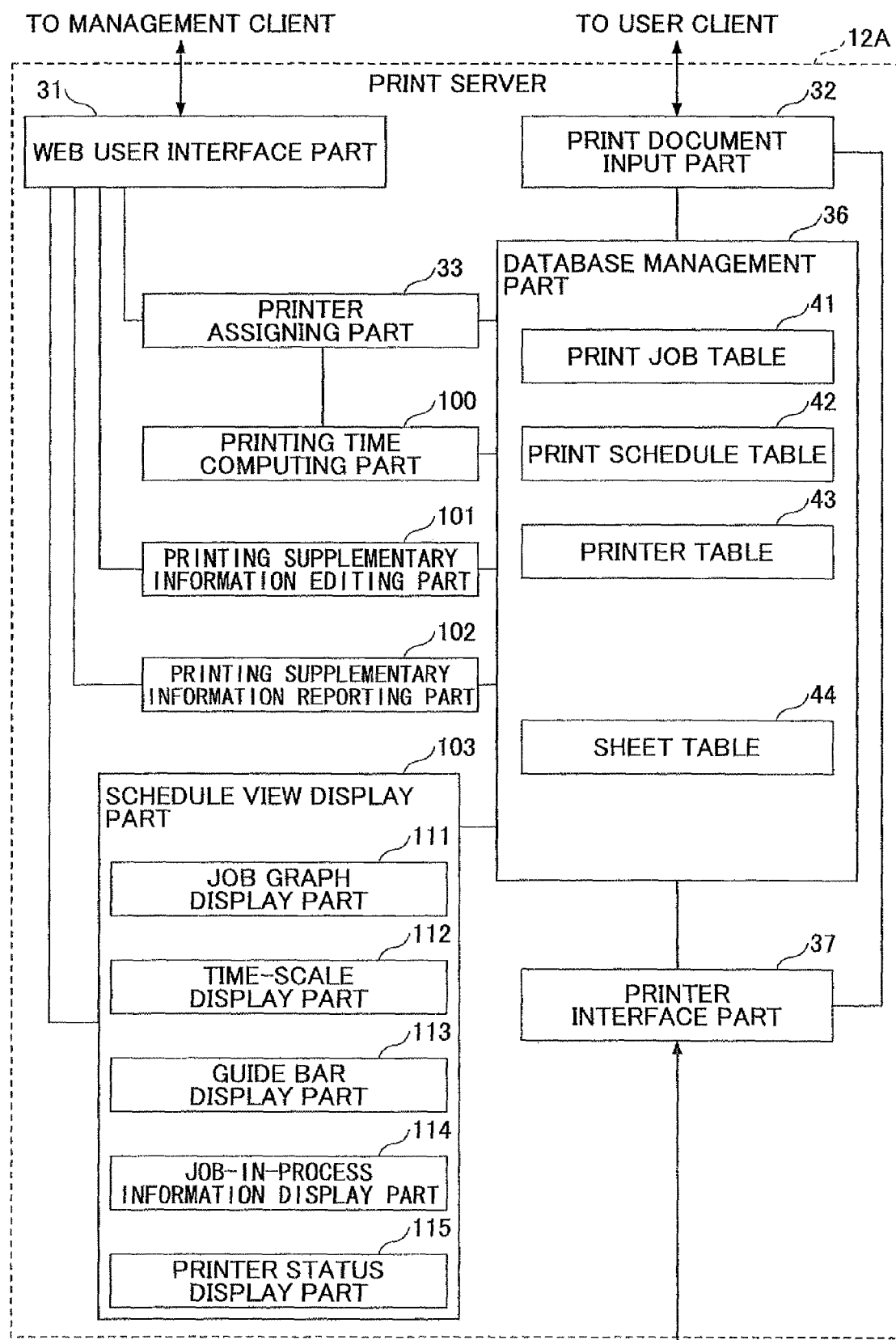
FIG. 13 is a process block diagram illustrating another example of the print server.

FIG. 13 is a process block diagram illustrating another example of the print server. Note that a system configuration and a print server 12A are similar to those described in the first embodiment, and duplicates of these descriptions are omitted.

The print server 12A has installed the printing management program. Note that the print server 12 executes the printing management program to implement functions of the web user interface part 31, the print document input part 32, the printer assigning part 33, the database management part 36, the printer interface part 37, a printing time computing part 100, a printing supplementary information editing part 101, a printing supplementary information reporting part 102 and a schedule view display part 103.

Note that the web user interface part 31 and the print document input part 32 are similar to those of the print server 12 illustrated in FIG. 3 and the descriptions of the web user interface part 31 and the print document input part 32 are thus omitted here. The database management part 36, for example, includes the print job table 41, the print schedule table 42, the printer table 43 and a sheet table 44.

The database management part 36 receives a request from the print document input part 32, the printer assigning part 33, the printer interface part 37, the printing time computing part 100, the printing supplementary information editing part 101 or the like to write data in a corresponding one of the print job table 41, the print schedule table 42, the printer table 43 and the sheet table 44.

The print job table 41 is configured to retain information on the print jobs received from the user client 1. Note that details of the print job table 41 are described later with reference to FIG. 14. The print schedule table 42 is configured to retain information on the expected printer device 13A currently ready to execute the print jobs, a current status of each of the print jobs, and a status of the sheet replacing job information which is retained in the sheet replacing job table 45 (see FIG. 2). Details of the print schedule table 42 are described later with reference to FIG. 15. Note that the printer table 43 and the sheet table 44 are similar to those of the print server 12 illustrated in FIG. 3 and the descriptions of the printer table 43 and the sheet table 44 are thus omitted here.

The printer interface part 37 is configured to control communications with the printer devices 13A. The printer interface part 37 searches for a subsequently predetermined print job by referring to the print schedule table 42 every time a report that the preceding print job has been completed has been received from the corresponding printer device 13A. Next, on finding the subsequently predetermined print job, the printer interface part 37 acquires details of the print job from the print job table 41.

The printer interface part 37 sends the print job held in the print document input part 32 to the corresponding printer device 13A based on the details of the acquired print job. The printer interface part 37 is further configured to receive status information from each of the printer devices 13A at predetermined intervals. Further, if the printer interface part 37 acknowledges one or more of the printer devices 13A that have changed their statuses, the printer interface part 37 requests the database management part 36 to replace the status information of the corresponding printer device 13A retained in the printer table 43 with the new status information (i.e., changed status information).

Moreover, the printer interface part 37 determines a status of the print job based on the status of the corresponding printer device 13A, and requests the database management part 36 to update the status of the print jobs retained in the print schedule table 42.

Note that the printer assigning part 33 is similar to that of the print server 12 illustrated in FIG. 3 and the descriptions of the printer assigning part 33 are thus omitted. The printing time computing part 100 is configured to compute a printing time of the print job that is executed in the printer device 13A.

The printing supplementary information editing part 101 is configured to edit "the information on a supplementary task of the print job" contained in the print job table 41 of the database management part 36. The printing supplementary information editing part 101 is configured to receive an editing request for editing of "the information on the supplementary task of the print job" contained in the print job table 41 from the operator via the web user interface part 31.

When a print job containing "the edited information on the supplementary task of the print job" contained in the print job table 41 in the job queue is ready to be processed, the printing supplementary information reporting part 102 reports content of the supplementary task (i.e., "the edited information on the supplementary task of the print job" contained in the print job table 41) to the operator via the web user interface part 31 before sending the print job containing "the edited information on the supplementary task of the print job" to the printer device 13A.

The schedule view display part 103 includes a job graph display part 111, a time-scale display part 112, a guide bar display part 113, a job-in-process information display part 114 and a printer status display part 115. The schedule view display part 103 is configured to be responsible for displaying a screen that is operated by the operator. The schedule view display part 103 is configured to display a schedule view screen that will be described later. The schedule view display part 103 is configured to retrieve necessary items from each of the tables of the database management part 36 to display the later-described schedule view screen.

FIG. 14 is a configuration diagram illustrating an example of the print job table 41. The print job table 41 of FIG. 14 includes an additional item of supplementary task information of the job in the print job table of FIG. 8.

FIG. 15 is a configuration diagram illustrating an example of the print schedule table 42. The print schedule table 42 includes items associated with following corresponding contents, which are a job ID, a job status, a job progress, a reason for waiting, a printer performing printing operation of a print job, an expected printing completion time of printing operation and printing duration.

Figure 16:
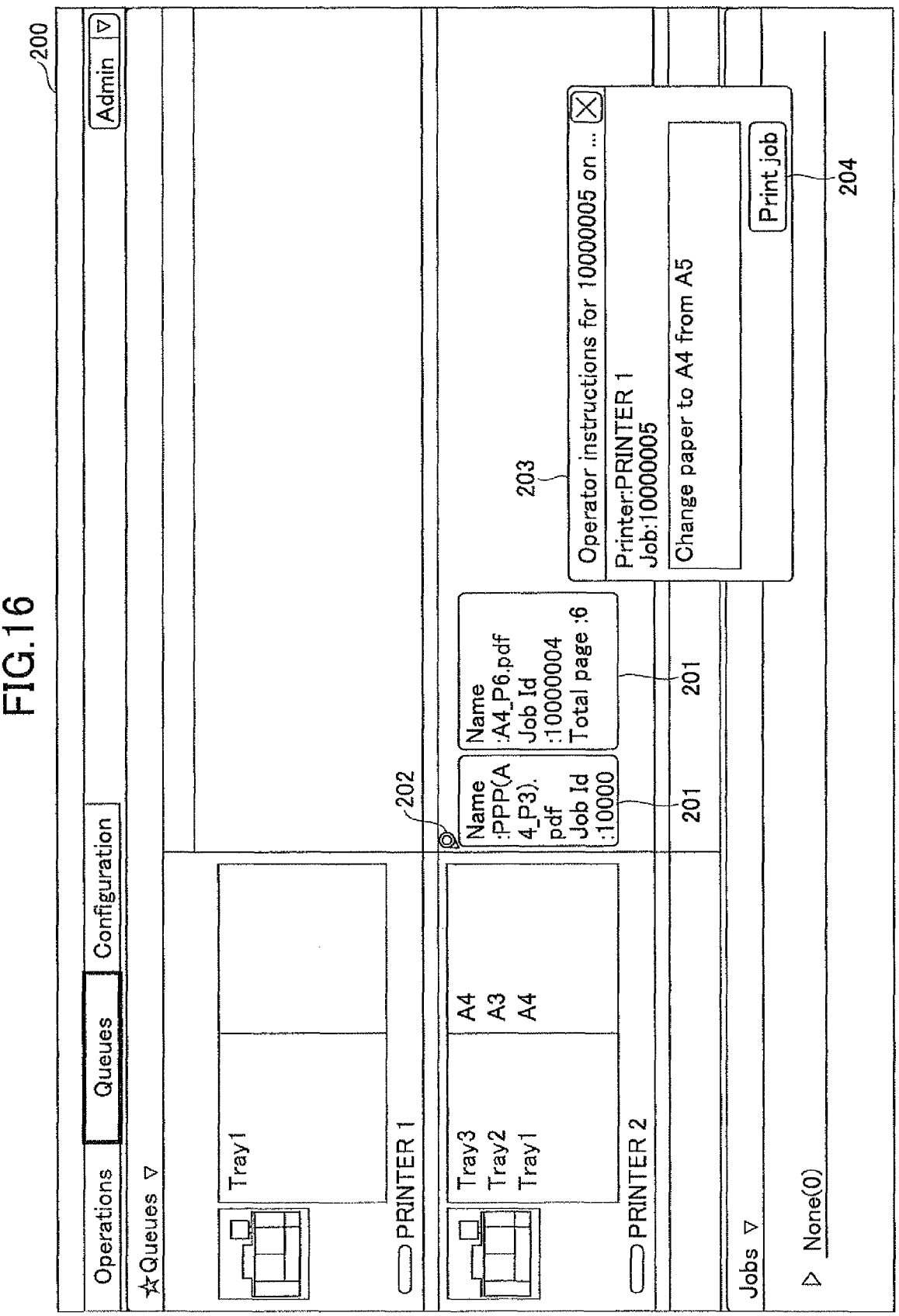
FIG. 16 is an image diagram illustrating an example of a schedule preview screen.

FIG. 16 is an image diagram illustrating an example of a schedule preview screen 200. The schedule preview screen 200 includes a print job (job-in-process) information display list 201 indicating a list of the print jobs assigned to each of the printer device 13A, a supplementary task icon 202 indicating the presence of a supplementary task accompanying the print job, and a supplementary task content informing screen 203 for informing the operator of the content of the supplementary task before sending the print job to the printer device 13A after the print job is allowed to be sent to the printer device 13A. The supplementary task content informing screen 203 includes a button 204 for the operator to press for sending the print job to the printer device 13A after the operator has completed the supplementary task.

Figure 17:
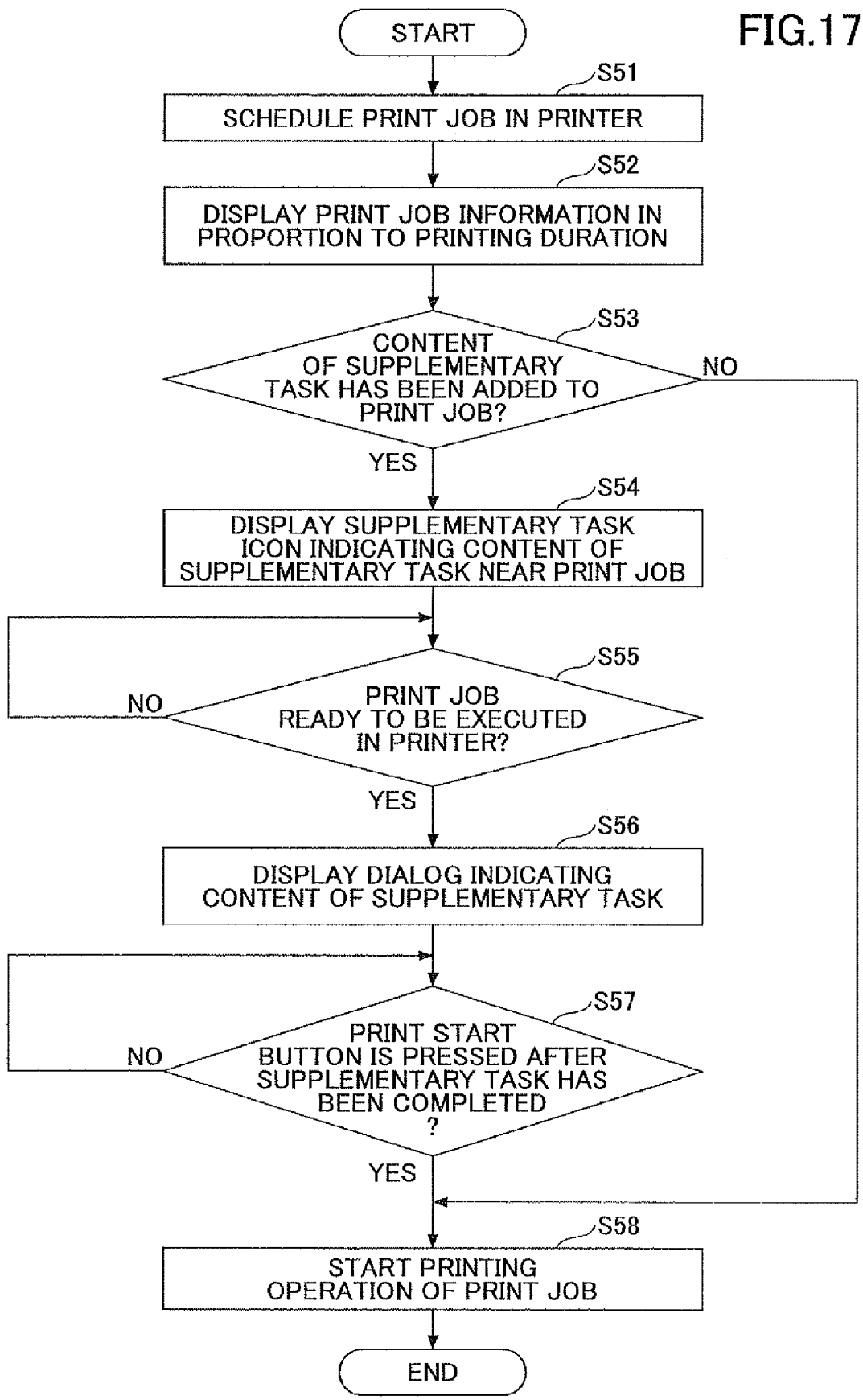
FIG. 17 is a flowchart illustrating an example of a print job sending operation utilizing the schedule view screen.

FIG. 17 is a flowchart illustrating an example of a print job sending operation utilizing the schedule view screen. In step S51, the printer assigning part 33 schedules a print job in the printer devices 13A.

In step S52, the job-in-process information display part 114 displays the print job information display list 201 that is a list of the print jobs, each displaying information with an image in proportion to its printing duration based on the information on printing duration remaining in the print schedule table 42.

In step S53, the job-in-process information display part 114 determines whether "the information on the supplementary task of the print job" has been edited; that is, whether content of the supplementary task has been added to the print job information.

If the content of the supplementary task has not been added to the print job information, the print job is sent to the printer device 13A in step S58 when the print job is ready to be processed in the job queue. If, on the other hand, the content of the supplementary task has been added to the print job information, the job-in-process information display part 114 displays the supplementary task icon 202 indicating that the print job includes a supplementary task near the print job information display list 201 in step S54.

When the print job is ready to be executed in the printer device 13A in step S55, the job-in-process information display part 114 displays the supplementary task content informing screen 203 for reporting the content of the supplementary task accompanying the print job to the operator in step S56.

When the button (print start button) 204 is pressed in step S57, the printer interface part 37 sends the print job to the printer device 13A to start a printing operation of the print job.

Figure 18:
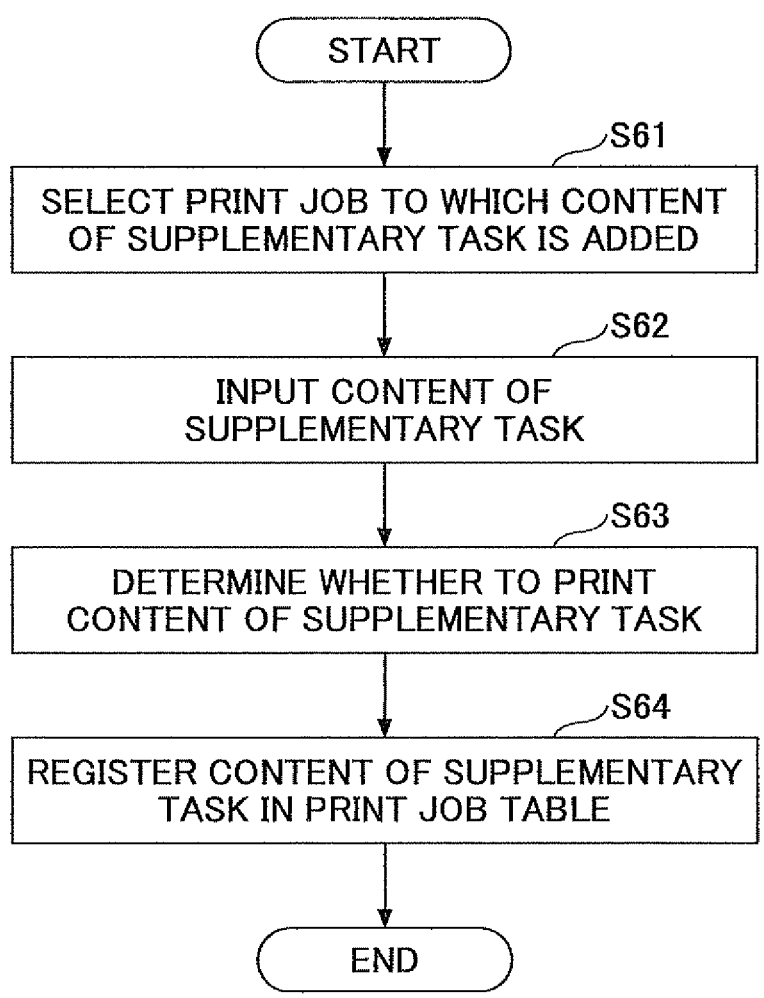
FIG. 18 is a flowchart illustrating an example of a supplementary task content editing process.

FIG. 18 is a flowchart illustrating an example of a supplementary task content editing process. In step S61, when the operator selects the print job to which the content of the supplementary task is to be added, the printing supplementary information editing part 101 receives the selected print job to which the content of the supplementary task is to be added from the operator via the web user interface part 31.

In step S62, when the operator inputs the content of the supplementary task to be added, the printing supplementary information editing part 101 receives the content of the supplementary task to be added from the operator via the web user interface part 31. For example, the printing supplementary information editing part 101 displays a supplementary task content editing screen 300 illustrated in FIG. 19 to enable the operator input the content of the supplementary task to be added to the print job, and receives the content of the supplementary task input by the operator via the web user interface part 31.

In step S63, when the operator determines whether to print the content of the supplementary task to be added to the print job, the printing supplementary information editing part 101 receives the selected result as to whether to print the content of the supplementary task to be added to the print job determined by the operator via the web user interface part 31. For example, the operator may determine to print the content of the supplementary task to be added to the print job by selecting a check box or the like displayed in the supplementary task content editing screen 300. The operator selects the check box displayed in the supplementary task content editing screen 300 so as to print the content of the supplementary task to be added to the print job.

In step S64, the printing supplementary information editing part 101 registers the content of the supplementary task to be added to the print job received via the supplementary task content editing screen 300 in the "the information on the supplementary task of the print job" retained in the print job table 41.

Figure 19:
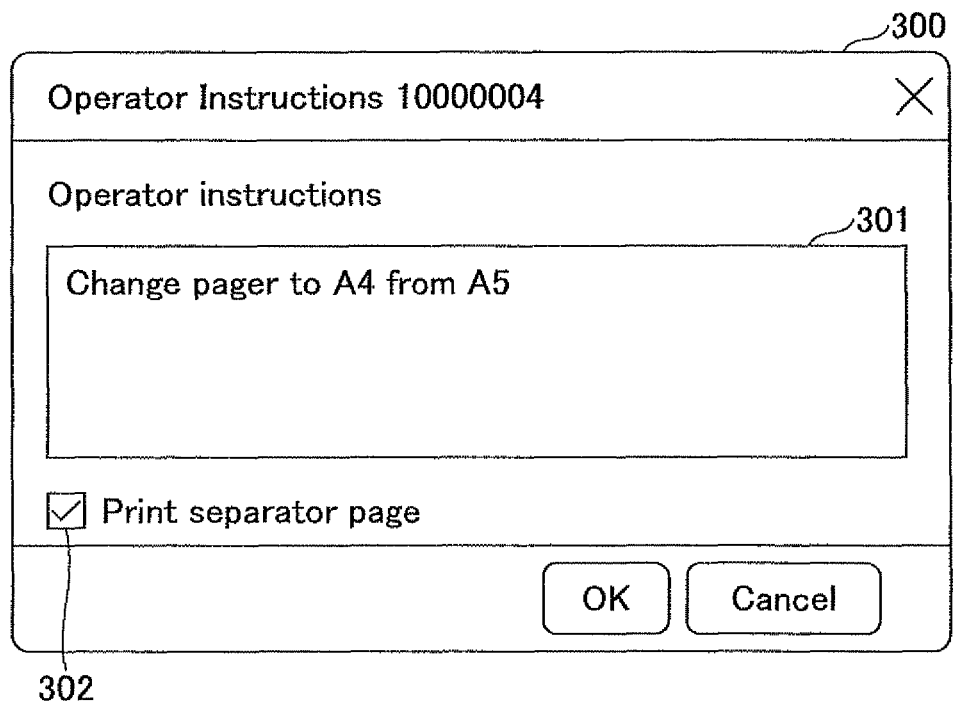
FIG. 19 is an image diagram illustrating an example of a sheet requirement registering screen.

FIG. 19 is an image diagram illustrating an example of the supplementary task content editing screen 300. The supplementary task content editing screen 300 illustrated in FIG. 19 includes a supplementary task content entry field 301 via which the supplementary task content editing screen 300 receives the content of the supplementary task to be added to the print job input by the operator and a check box 302 via which the supplementary task content editing screen 300 receives the selected result as to whether to print the content of the supplementary task to be added to the print job selected by the operator.

In the second embodiment, the content of the supplementary task to be added to the print job may be received by allowing the print job to be selected via the schedule view screen 200. The print job to which the content of the supplementary task has been added may be displayed as a supplementary task icon 202 near the print job information display list 201 on the schedule view screen 200. Accordingly, the operator may be able to easily identify that the print job is accompanied by the supplementary task.

When the print job accompanied by the supplementary task is ready to be sent to the printer device 13A, the content of the supplementary task to be added to the print job is displayed on the supplementary task content informing screen 203, which is displayed as a fore-screen of the schedule view screen 200. Accordingly, the operator may be able to easily identify the content of the supplementary task accompanying the print job immediately before sending the print job to the printer device 13A.

Even if the supplementary task accompanying the print job is ready to be sent to the printer device 13A, the print server 12A temporarily stops sending the print jobs scheduled to be sent subsequent to the print job accompanied by the supplementary task until the operator completes the supplementary task. Accordingly, the operator performs the supplementary task of the print job efficiently without allowing the printer device 13A to be seized.

Note that the first and second embodiments may be combined. The invention is not limited to the embodiments disclosed above, and various modifications and alterations may be made without departing from the scope of the inventions described in the claims.

The scheduling unit described in the claims corresponds to the printer assigning part 33. The capability change job generator described in the claims corresponds to the sheet replacing job controller 34. The capability change informing unit described in the claims corresponds to the sheet replacement informing part 35. The editing unit described in the claims corresponds to the printing supplementary information editing part 101. The reporting unit described in the claims corresponds to the printing supplementary information reporting part 102. The printing management device described in the claims corresponds to the print server 12.

Note that any elements, expressions, or combinations, as appropriate, of the aforementioned constituting elements and so forth applied to a method, device, system, computer program, recording medium, and the like are all effective as and encompassed by the embodiments of the present invention.

The embodiments discussed above may provide the printing management device, the printing management method, the printing system and the recording medium storing the printing management program that are capable of reducing the printing operation interrupting time.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that various changes, substitutions, and alterations could be made hereto without departing from the spirit and scope of the invention.

This patent application is based on Japanese Priority Patent Application No. 2011-045638 filed on Mar. 2, 2011, the entire contents of which are hereby incorporated herein by reference.

What is claimed is:

1. A non-transitory computer-readable recording medium comprising a printing management program, which, when processed by a computer, causes the computer to:
   schedule sequential processes of a plurality of print jobs with a printer by determining whether or not each received print job is allowed to be queued based on a sheet size of sheets placed in the printer, and when it is determined that the received print job is allowed to be queued, causing the allowed print job to queue in the printer; and control a sheet replacing job to execute an instruction to stop processing the print jobs and an instruction to replace first size sheets placed in the printer with second size sheets after completion of a set of first size print jobs using the first size sheets is specified before the replacement of the sheets, and execution of second size print jobs handling the second size sheets differing from the first size sheets is specified after the replacement of the first size sheets, wherein when the set of first size sheets are placed in the printer, and the set of second size sheets are not placed in the printer, the scheduling includes queuing the set of first size print jobs handling the first size sheets before the sheet replacing job including the instruction to replace the first size sheets placed in the printer with the second size sheets subsequent to the execution of the set of the first size print jobs, and queuing the set of the second size print jobs handling the second size sheets after the sheet replacing job has been queued, and wherein the controlling includes deleting the sheet replacing job from an array of the first size print jobs, the sheet replacing job, and the second size print jobs when the first size sheets placed in the printer are replaced with the second size sheets.

2. The non-transitory computer-readable recording medium as claimed in claim 1, wherein the printing management program further causes the computer to function as:

a sheet replacement informing unit configured to issue a sheet replacement notification for prompting operation of the sheet replacing job when the sheet replacing job is to be processed.

3. The non-transitory computer-readable recording medium as claimed in claim 1, wherein the printing management program further causes the computer to function as:

an editing unit configured to allow an operator to edit information on the print job such that a content of a supplementary task accompanying the print job is added to the print job; and a reporting unit configured to report to the operator the content of the supplementary task accompanying the print job, before the print job accompanied by the supplementary task is sent to the image forming apparatus, when the print job accompanied by the supplementary task is ready to be processed.

4. The non-transitory computer-readable recording medium as claimed in claim 3, wherein the editing unit indicates to the operator the print job accompanied by the supplementary task on a screen together with a schedule of the print job in association with the content of the supplementary task added to the print job.

5. A printing system comprising:

the non-transitory computer-readable recording medium storing the printing management program as claimed in claim 1; and an image forming apparatus configured to perform a printing operation based on the printing management program when executed by a processor.

6. The non-transitory computer-readable recording medium as claimed in claim 1, wherein print jobs requiring the first sheet size are queued for sequential processing before the sheet replacing job and print jobs requiring the second sheet size are queued for sequential processing after the sheet replacing job.

7. The non-transitory computer-readable recording medium as claimed in claim 1, wherein the sheet replacing job includes sheet information including a sheet size before sheet replacement and a sheet size after sheet replacement.

8. A printing management device comprising:

a processor; and a storage device, the storage device including instructions that, when executed by the processor, cause the processor to implement, a scheduling unit configured to receive and queue a plurality of print jobs in a printer and schedule sequential processing of the plurality of print jobs by determining whether or not each received print job is allowed to be queued based on a sheet size of sheets placed in the printer, and when it is determined that the received print job is allowed to be queued, cause the allowed print jobs to queue in the printer; and a sheet replacing job controller configured to control a sheet replacing job to execute an instruction to stop processing the print jobs and an instruction to replace first size sheets placed in the printer with second size sheets after completion a set of first size print jobs handling the first size sheets when execution of the first size print jobs using the first size sheets is specified before replacement of the sheets, and execution of the second size print jobs handling the second size sheets differing from the first size sheets is specified after the replacement of the sheets, wherein when the set of first size sheets are placed in the printer, and the set of second size sheets are not placed in the printer, the scheduling includes queuing the set of first size print jobs handling the first size sheets before the sheet replacing job, queuing the sheet replacing job including the instruction to replace the first size sheets placed in the printer with the second size sheets subsequent to the execution of the set of the first size print jobs, and queuing the set of the second size print jobs handling the second size sheets after the sheet replacing job has been queued, and wherein the controlling includes deleting the sheet replacing job from an array of the first size print jobs, the sheet replacing job, and the second size print jobs when the first size sheets placed in the printer are replaced with the second size sheets.

9. The print management device as claimed in claim 8, wherein print jobs requiring the first sheet size are queued for sequential processing before the sheet replacing job and print jobs requiring the second sheet size are queued for sequential processing after the sheet replacing job.

10. The print management device as claimed in claim 8, wherein the sheet replacing job includes sheet information including a sheet size before sheet replacement and a sheet size after sheet replacement.

11. A printing management method comprising:

receiving and queuing a plurality of print jobs to be printed by a printer;

scheduling sequential processes of a plurality of print jobs with a printer by determining whether or not each received print job is allowed to be queued based on a sheet size of sheets placed in the printer and, when it is determined that the received print job is allowed to be queued, cause the allowed print job to queue in the printer; and controlling a sheet replacing job to execute an instruction to stop processing the print jobs and an instruction to replace first size sheets placed in the printer with second size sheets after completion of a set of first size print jobs handling the first size sheets when execution of the first size print jobs using the first size sheets is specified before the replacement of the sheets, and execution of the second size print jobs handling the second size sheets differing from the first size sheets is specified after the replacement of the first size sheets, wherein when the set of first size sheets are placed in the printer, and the set of second size sheets are not placed in the printer, the scheduling includes queuing the set of first size print jobs handling the first size sheets before the sheet replacing job, queuing the sheet replacing job including the instruction to replace the first size sheets placed in the printer with the second size sheets subsequent to the execution of the set of the first size print jobs, and queuing the set of the second size print jobs handling the second size sheets after the sheet replacing job has been queued, and wherein the controlling includes deleting the sheet replacing job from an array of the first size print jobs, the sheet replacing job, and the second size print jobs when the first size sheets placed in the printer are replaced with the second size sheets.

12. The print management method as claimed in claim 11, wherein print jobs requiring the first sheet size are queued for sequential processing before the sheet replacing job and print jobs requiring the second sheet size are queued for sequential processing after the sheet replacing job.

13. The print management method as claimed in claim 11, wherein the sheet replacing job includes sheet information including a sheet size before sheet replacement and a sheet size after sheet replacement.

14. A printing system comprising a printing management device and an image forming apparatus, wherein the printing management device includes:

a scheduling unit configured to receive and queue a plurality of print jobs in a printer and schedule sequential processing of the plurality of print jobs by determining whether or not each received print job is allowed to be queued based on a sheet size of sheets placed the printer and, when it is determined that the received print job is allowed to be queued, causing the allowed print job to queue in the printer; and a sheet replacing job controller configured to control a sheet replacing job to execute an instruction to stop processing of print jobs and an instruction to replace first size sheets placed in the printer with second size sheets of a different size after completion of a set of first size print jobs handling the first size sheets when execution of the first size print jobs using the first size sheets is specified before replacement of the sheets, and execution of second size print jobs handling the second size sheets differing from the first size sheets is specified after the replacement of the sheets in the printer, wherein when the set of first size sheets are placed in the printer, and the set of second size sheets are not placed in the printer, the scheduling includes queuing the set of first size print jobs handling the first size sheets before the sheet replacing job, queuing the sheet replacing job including the instruction to replace the first size sheets placed in the printer with the second size sheets subsequent to the execution of the set of the first size print jobs, and queuing the set of the second size print jobs handling the second size sheets after the sheet replacing job has been queued, and wherein the controlling includes deleting the sheet replacing job from an array of the first size print jobs, the sheet replacing job, and the second size print jobs when the first size sheets placed in the printer are replaced with the second size sheets.

15. The printing system of claim 14, wherein print jobs requiring the first sheet size are queued for sequential processing before the sheet replacing job and print jobs requiring the second sheet size are queued for sequential processing after the sheet replacing job.

16. The printing system of claim 14, wherein the sheet replacing job includes sheet information including a sheet size before sheet replacement and a sheet size after sheet replacement.

* * * * *